US00RE46308E

(19) United States
(12) Reissued Patent
Mateos Martin

(10) Patent Number: US RE46,308 E
(45) **Date of Reissued Patent: *Feb. 14, 2017**

(54) DUAL FUEL HEATER

(71) Applicant: Coprecitec, S.L., Aretxabaleta (Gipuzkoa) (ES)

(72) Inventor: Ruben Mateos Martin, Marietta, GA (US)

(73) Assignee: Coprecitec, S.L., Aretxabaleta, Gipuzkoa (ES)

( * ) Notice: This patent is subject to a terminal disclaimer.

(21) Appl. No.: 14/865,176

(22) Filed: Sep. 25, 2015

Related U.S. Patent Documents

Reissue of:

(64) Patent No.: 8,777,609
Issued: Jul. 15, 2014
Appl. No.: 13/801,003
Filed: Mar. 13, 2013

U.S. Applications:

(63) Continuation of application No. 13/278,931, filed on Oct. 21, 2011, now Pat. No. 8,403,661, which is a continuation-in-part of application No. 12/237,131, filed on Sep. 24, 2008, now Pat. No. 8,118,590, which is a continuation-in-part of application No. 11/684,368, filed on Mar. 9, 2007, now Pat. No. 7,766,006.

(51) Int. Cl.

| | |
|---|---|
| ***F24H 3/00*** | (2006.01) |
| ***F23N 1/00*** | (2006.01) |
| ***F24H 9/20*** | (2006.01) |
| ***F23N 5/00*** | (2006.01) |
| ***F23C 1/00*** | (2006.01) |
| *F23N 3/06* | (2006.01) |

(52) U.S. Cl.
CPC ..... *F23N 1/005* (2013.01); *F23C 1/00* (2013.01); *F23N 5/003* (2013.01); *F23N 5/006* (2013.01); *F24H 9/2085* (2013.01); *F23N 3/06* (2013.01)

(58) Field of Classification Search
CPC ..... F24H 3/006; F24H 9/2085; F23N 5/006; F23N 5/003; F23N 3/06; F23C 1/00
USPC ..... 431/75, 281, 9, 182, 183, 174
See application file for complete search history.

(56) References Cited

U.S. PATENT DOCUMENTS

| | | | | |
|---|---|---|---|---|
| 962,752 | A | 6/1910 | Dudgeon | F24B 1/1808 126/512 |
| 1,639,780 | A | 8/1927 | Mulholland | F24C 3/042 126/92 AC |
| 2,129,231 | A | 9/1938 | Parker | F16K 11/0856 137/625.19 |
| 2,285,866 | A | 6/1942 | Markle | G01N 25/32 136/218 |
| 2,380,956 | A | 8/1945 | Evarts | F17C 13/045 137/113 |
| 2,582,582 | A | 1/1952 | Bottom | F23D 14/045 236/91 R |
| 2,592,132 | A | 4/1952 | Archie et al. | F23D 11/24 137/563 |

(Continued)

FOREIGN PATENT DOCUMENTS

| | | |
|---|---|---|
| DE | 720854 | 5/1942 |
| ES | U200800992 | 7/2008 |

(Continued)

OTHER PUBLICATIONS

Style Selections; Vent-free Fireplace; Model 551D280T; US; available as of Mar. 9, 2007.*

(Continued)

*Primary Examiner* — William Doerrler
(74) *Attorney, Agent, or Firm* — Edell, Shapiro & Finnan LLC

(57) ABSTRACT

A heater having first and second oxygen depletion sensors and a main burner injector and configurable for the delivery of at least first and second types of fuels.

4 Claims, 16 Drawing Sheets

(56) References Cited

U.S. PATENT DOCUMENTS 2,630,821 A 3/1953 Arey et al. ..... F17C 13/045 116/277
2,661,157 A 12/1953 Reichelderfer ..... F23D 14/60 236/1 A
2,687,140 A 8/1954 St. Clair ..... F17C 13/045 137/113
2,750,997 A 6/1956 Reuter ..... F23D 14/64 239/536
3,001,541 A 9/1961 Clair ..... B60G 17/0525 137/113
3,082,305 A 3/1963 Wunder ..... H01H 37/52 219/510
3,139,879 A 7/1964 Bauer et al. ..... F23D 14/12 126/38
3,265,299 A 8/1966 Rice et al. ..... F23N 5/105 122/14.22
3,295,585 A 1/1967 Kovack, Jr. et al. ... F23D 14/60 431/22
3,331,392 A 7/1967 Davidson et al. .. F15B 13/0814 137/559
3,469,590 A 9/1969 Barker ..... F16K 31/0675 137/1
3,590,806 A 7/1971 Locke ..... F24C 3/14 126/92 B
3,595,270 A 7/1971 McNeal, Jr. ..... F16K 11/202 137/575
3,706,303 A 12/1972 Hapgood ..... F23M 20/005 122/356
3,740,688 A 6/1973 McIntosh et al. ..... F23N 5/025 337/407
3,747,586 A 7/1973 Weiss ..... F24H 9/2085 126/110 B
3,814,573 A 6/1974 Karlovetz ..... F23D 14/145 431/329
3,817,686 A 6/1974 Quittner ..... F23D 91/02 126/92 R
3,829,279 A 8/1974 Qualley et al. ..... F23D 14/62 431/354
D243,694 S 3/1977 Faulkner ..... D23/339
4,020,870 A 5/1977 Carlson ..... F16K 5/0214 137/625.3
4,290,450 A 9/1981 Swanson ..... F16K 11/24 137/606
4,340,362 A 7/1982 Chalupsky et al. .. F24H 3/0488 431/353
4,348,172 A 9/1982 Miller ..... F23Q 3/002 431/255
4,355,659 A 10/1982 Kelchner ..... F16K 11/0856 137/597
4,640,674 A 2/1987 Kitchen ..... F23C 15/00 431/1
4,640,680 A 2/1987 Schilling ..... F23D 14/64 431/347
4,651,711 A 3/1987 Velie ..... F24H 3/0488 126/110 B
4,718,448 A 1/1988 Love et al. ..... F23N 1/005 137/271
4,718,846 A 1/1988 Oguri et al. ..... F23N 5/006 126/92 AC
4,768,543 A 9/1988 Wienke et al. ..... F16K 1/305 137/240
4,768,947 A 9/1988 Adachi ..... F23N 1/022 122/14.21
4,779,643 A 10/1988 Genbauffe ..... F16K 5/0207 137/599.17
4,782,814 A 11/1988 Cherryholmes ..... F24C 3/14 126/92 B
4,848,313 A 7/1989 Velie ..... F24H 3/0488 126/110 B
4,930,538 A 6/1990 Browne ..... F16K 27/0263 137/269
4,962,749 A 10/1990 Dempsey et al. ..... F23N 1/062 126/110 E
4,965,707 A 10/1990 Butterfield ..... F24C 7/004 362/806
5,039,007 A 8/1991 Wolter ..... A47J 31/54 126/19.5
5,090,899 A 2/1992 Kee ..... F23D 14/64 126/92 AC
5,172,728 A 12/1992 Tsukazaki ..... F16K 1/446 137/240
5,199,385 A 4/1993 Doss ..... F24H 1/205 110/162
5,201,651 A 4/1993 Niksic et al. ..... F23N 1/027 126/110 B
5,239,979 A 8/1993 Maurice et al. ..... F24C 3/022 119/304
5,251,823 A 10/1993 Joshi et al. ..... F23D 11/107 239/401
5,314,007 A 5/1994 Christenson ..... B60H 1/3202 123/557
5,391,074 A 2/1995 Meeker ..... F23N 5/105 110/186
5,393,222 A 2/1995 Sutton ..... F23N 5/10 431/328
5,413,141 A 5/1995 Dietiker ..... F23N 1/007 137/489
5,452,709 A 9/1995 Mealer ..... F24C 3/006 126/512
5,470,018 A 11/1995 Smith ..... F23N 1/007 126/116 A
5,486,107 A 1/1996 Bonne ..... G01N 33/2829 374/43
5,503,550 A 4/1996 DePalma ..... F23D 14/72 126/292
5,513,798 A 5/1996 Tavor ..... B05B 7/0475 239/405
5,542,609 A 8/1996 Meyers ..... B01F 5/08 239/427
5,553,603 A 9/1996 Barudi et al. ..... F23D 14/60 126/512
5,567,141 A 10/1996 Josh et al. ..... F23D 11/106 239/419
5,575,274 A 11/1996 DePalma ..... F23D 14/72 126/285 R
5,584,680 A 12/1996 Kim ..... F24C 3/006 126/512
5,603,211 A 2/1997 Graves ..... F23C 7/002 60/39.48
5,632,614 A 5/1997 Consadori et al. ..... F23N 5/082 219/260
5,642,580 A 7/1997 Hess et al. ..... F21S 10/04 40/428
5,645,043 A 7/1997 Long et al. ..... F24C 1/10 126/91 R
5,674,065 A 10/1997 Grando et al. ..... F24C 3/006 126/512
D391,345 S 2/1998 Mandir et al. ..... D23/339
5,738,084 A 4/1998 Hussong ..... F24C 3/122 126/116 A
5,782,626 A 7/1998 Joos et al. ..... F23D 11/007 431/181
5,807,098 A 9/1998 Deng ..... F23N 5/006 126/112
5,814,121 A 9/1998 Travis ..... C03B 5/2353 239/430
5,838,243 A 11/1998 Gallo ..... F23N 5/242 236/21 R
5,839,428 A 11/1998 Schroeter et al. ..... F24C 3/042 126/512
5,906,197 A 5/1999 French et al. ..... F24C 15/02 126/512
5,915,952 A 6/1999 Manning et al. ..... F24C 3/122 431/12
5,941,699 A 8/1999 Abele ..... F23N 5/107 126/92 AC

(56) References Cited

U.S. PATENT DOCUMENTS 5,945,017 A 8/1999 Cheng et al. ..... F23D 14/76 219/446.1
5,966,937 A 10/1999 Graves ..... F23C 7/004 239/400
5,975,112 A 11/1999 Ohmi et al. ..... F16K 27/003 137/240
5,984,662 A 11/1999 Barudi et al. ..... F23D 14/70 126/512
5,987,889 A 11/1999 Graves et al. ..... F23C 7/004 60/746
5,988,204 A 11/1999 Reinhardt et al. . G05D 16/0661 137/271
6,035,893 A 3/2000 Ohmi et al. ..... F15B 13/0814 137/597
6,045,058 A 4/2000 Dobbeling et al. ... B05B 1/3442 239/11
6,068,017 A 5/2000 Haworth et al. .... F02D 19/0647 123/527
6,076,517 A 6/2000 Kahlke et al. ..... F23D 14/64 126/39 E
6,170,507 B1 1/2001 Dalton et al. ..... G05D 16/0661 137/12
6,192,913 B1 2/2001 Willey et al. ..... F23D 14/725 137/66
6,197,195 B1 3/2001 Booth et al. ..... B01D 29/35 137/454.6
6,227,194 B1 5/2001 Barudi et al. ..... F24B 1/1808 126/112
6,227,451 B1 5/2001 Caruso ..... F23C 3/002 165/146
6,244,524 B1 6/2001 Tackels et al. ..... F23C 5/06 239/403
6,257,230 B1 7/2001 Barudi et al. ..... F24C 15/002 126/502
6,257,270 B1 7/2001 Ohmi et al. ..... F16K 27/003 137/240
6,257,871 B1 7/2001 Weiss et al. ..... F23N 3/085 431/20
6,321,779 B1 11/2001 Miller et al. ..... G05D 16/103 137/340
6,340,298 B1 1/2002 Vandrak et al. ..... F24C 3/14 126/110 B
6,354,072 B1 3/2002 Hura ..... F23D 11/107 60/776
6,443,130 B1 9/2002 Turner et al. ..... F02M 21/0239 123/198 D
6,543,235 B1 4/2003 Crocker et al. ..... F23C 9/006 60/742
6,648,627 B2 11/2003 Dane ..... F23N 5/10 431/22
6,648,635 B2 11/2003 Vandrak et al. ..... F24C 3/14 126/110 B
6,705,342 B2 3/2004 Santinanavat et al. ..... F02M 21/0233 137/489
6,880,549 B2 4/2005 Topp ..... F23D 14/00 126/110 B
6,884,065 B2 4/2005 Vandrak et al. ..... F24C 3/042 126/110 B
6,904,873 B1 6/2005 Ashton ..... F23K 5/005 122/446
6,938,634 B2 9/2005 Dewey, Jr. ..... F23K 5/007 137/1
7,044,729 B2 5/2006 Ayastuy et al. ..... F23N 1/00 431/25
7,251,940 B2 8/2007 Graves et al. ..... F23D 11/107 60/742
7,280,891 B2 10/2007 Chase et al. ..... F23N 5/082 431/76
7,300,278 B2 11/2007 Vandrak et al. ..... F24C 3/042 126/110 B
7,434,447 B2 10/2008 Deng ..... F23N 5/003 73/23.2
7,497,386 B2 3/2009 Donnelly et al. ..... F23N 1/002 236/15 BG
7,607,426 B2 10/2009 Deng ..... F23Q 9/045 126/116 A
7,730,765 B2 6/2010 Deng ..... F23N 5/10 73/23.2
7,766,006 B1 8/2010 Manning ..... F23N 1/005 126/112
8,403,661 B2 * 3/2013 Mateos Martin ..... F23N 1/005 126/85 R
2001/0037829 A1 11/2001 Shaw et al. ..... F16K 1/307 137/315.01
2002/0058266 A1 5/2002 Clough et al. ..... C12Q 1/18 435/6.15
2002/0160325 A1 10/2002 Deng ..... F23D 14/725 431/76
2002/0160326 A1 10/2002 Deng ..... F23D 14/725 431/79
2003/0049574 A1 3/2003 Dane ..... F23N 5/10 431/76
2003/0168102 A1 9/2003 Santinanavat et al. ..... F02M 21/0233 137/489
2003/0192591 A1 10/2003 Strom ..... F23K 5/002 137/269
2003/0198908 A1 10/2003 Berthold et al. ..... F24C 3/006 431/125
2004/0096790 A1 5/2004 Querejeta et al. .... F23D 14/725 431/80
2004/0238029 A1 12/2004 Haddad ..... F02M 13/08 137/66
2004/0238030 A1 12/2004 Dewey, Jr. ..... F23K 5/007 137/66
2005/0175944 A1 8/2005 Ahamady ..... F23C 3/002 431/18
2007/0224558 A1 9/2007 Flick et al. ..... F23N 1/002 431/75
2007/0266765 A1 11/2007 Deng ..... F23N 5/003 73/23.2
2007/0277803 A1 12/2007 Deng ..... F23Q 9/045 126/92 AC
2007/0277812 A1 12/2007 Deng ..... F23Q 9/045 126/92 AC
2007/0277813 A1 12/2007 Deng ..... F23C 1/08 126/92 R
2008/0149871 A1 6/2008 Deng ..... F16K 11/0836 251/142
2008/0149872 A1 6/2008 Deng ..... F16K 11/0836 251/142
2008/0153044 A1 6/2008 Deng ..... F23N 1/005 431/74
2008/0153045 A1 6/2008 Deng ..... F23N 5/245 431/76
2008/0223465 A1 9/2008 Deng ..... F23D 14/00 137/625.4
2008/0227045 A1 9/2008 Deng ..... F23C 1/08 431/354
2009/0280448 A1 11/2009 Antxia Uribetxebarria et al. ..... F23N 5/242 431/255
2010/0035196 A1 2/2010 Deng ..... F16K 11/0836 431/278

FOREIGN PATENT DOCUMENTS

GB 2319106 A 5/1998
GB 2330438 A 4/1999
JP 58219320 12/1983
JP 03230015 10/1991
JP 2003056845 2/2003
JP 2003074837 3/2003

(56) References Cited

FOREIGN PATENT DOCUMENTS

| | | |
|---|---|---|
| JP | 2003074838 | 3/2003 |
| WO | WO0050815 A1 | 8/2000 |

OTHER PUBLICATIONS

Comfort Glow; Vent-Free Gas Space Heaters; Ultra Slim; available as of Mar. 9, 2007.*
Comfort Glow; Vent-Free Gas Space Heaters; Solarfusion; available as of Mar. 9, 2007.*
Glo-Warm; Blue Flame Vent-Free Space Heaters; available as of Mar. 9, 2007.*
Reddyheater; Garage Heaters; The Outdoorsman; available as of Mar. 9, 2007.*
Vanguard; Single Burner 26" Compact; Dual burner 26" Compact; Classic Hearth 32"; Classic Pro 36"; available as of Mar. 9, 2007.*
Vent-Free Gas Log Heaters; Blaze N Glow Oak; available as of Mar. 9, 2007.*
Vanguard; Cast Iron Gas Stove Heaters; available as of Mar. 9, 2007.*
Vanguard; Vent-Free Gas Space Heaters; available as of Mar. 9, 2007.*
Hearth Sense; Dual Fuel; available as of Mar. 9, 2007.*
Napoleon; The Madison Installation and Operation Instructions; May 24, 2005.*
Napoleon; Park Avenue Installation and Operation Instructions; Jul. 20, 2006.*
Heat and Glo; Escape Series Gas Fireplaces; Mar. 2005.*
Heat and Glo; Owner's Manual; Escape-42DV; Dec. 2006.*

* cited by examiner

DUAL FUEL HEATER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a continuation of U.S. application Ser. No. 13/278,931 filed Oct. 21, 2011, which is a continuation-in-part to U.S. application Ser. No. 12/237,131, filed Sep. 24, 2008, which is a continuation-in-part to U.S. application Ser. No. 11/684,368, filed Mar. 9, 2007.

TECHNICAL FIELD

The present invention relates generally to gas heaters and, more particularly, to unvented gas heaters.

BACKGROUND

Unvented gas heaters are designed to be used indoors without pipes, ducts, or other conduit to vent the heater's exhaust to the exterior atmosphere. Vent free gas heaters typically include one or more gas burners and optionally one or more ceramic containing heating elements in a housing and optionally one or more artificial logs. The gas and air mix in the heater where combustion takes place. These heaters may have a blower to force air flow through the heater providing the release of heated gases or convective heat.

Unvented gas heaters have been designed to be free standing, mounted on a wall, or in a decorative housing such as a vent free fireplace. The housing providing a vent free fireplace is typically substantially the size of a fireplace and has artificial logs. Some have even been designed with a glass front to provide the appearance of an enclosed fireplace.

The unvented heaters of the prior art are typically designed to use either natural gas or liquid propane gas as a fuel source. It is not permitted for a manufacturer to supply a conversion kit for an unvented gas heater to convert from one fuel source to another in the field. Even if such a conversion kit were permitted, as is the case with vented gas heaters, to change fuel source gas type on a heater in the field, requires the installer to change the regulator, pilot orifice and burner orifice for the alternate gas type.

SUMMARY OF THE DISCLOSURE

A dual fuel gas burner is provided for use in a vent free heater. Embodiments of the dual fuel vent free gas burner can be used in free standing heaters, wall mount heaters, gas fireplaces, or other vent free heaters as is known in the art. A dual fuel vent free gas heater provides convective and/or radiant heat preferably to an indoor environment. The heater may be designed to use natural convective air currents and may optionally have a fan enhancing the natural convective currents within the heater. Alternatively, a fan may be used to force the gases and/or air within the heater at desired flow patterns which may be counter to natural convective forces.

This gas heater can be operated with multiple fuels such as liquid propane or natural gas without changing or adding components or parts. In some embodiments, an installer turns a selector valve plumbed in the product gas train. This selection sends the correct gas type to the correct fuel injector and pilot burner. Preferably, all internal plumbing connections are performed at the factory rather than onsite by the user or installer.

Embodiments of the gas heater can be operated on liquid propane or natural gas by connecting the fuel supply to the correct regulator on the heater. The installer or user then turns a selector valve, in selected embodiments, plumbed in the product gas train. This selection sends the correct gas type to the correct injector and pilot burner for the supply gas. Optionally, an oxygen detection system is incorporated within the heater. Advantageously, the heater is thermostatically controlled.

According to one implementation a dual fuel heater is provided comprising: a first oxygen depletion sensor adapted for a first fuel, a second oxygen depletion sensor adapted for a second fuel, a main burner adapted for both the first fuel and the second fuel, a single pressure regulator having a single fuel inlet and a single fuel outlet and adapted to regulate the pressure at the single fuel outlet of the first fuel delivered at the single fuel inlet at a first pressure or the second fuel delivered at the single fuel inlet at a second pressure, a control valve having a first inlet fluid communicable with a first outlet and a second outlet, the first inlet coupled to the single fuel outlet of the single pressure regulator, the control valve adapted to control the flow of fuel to the first and second oxygen depletion sensors through the first outlet and to control the flow of fuel to the main burner through the second outlet, a selector valve comprising a first inlet fluid communicable with a first outlet and a second inlet fluid communicable with a second outlet, the first inlet of the selector valve coupled with the first outlet of the control valve by a first conduit, the second inlet of the selector valve coupled with the second outlet of the control valve by a second conduit, the first outlet of the selector valve in fluid communication with the first oxygen depletion sensor, the second outlet of the selector valve in fluid communication with the main burner, the selector valve comprising a regulating organ adapted to transition between a first selector position and a second selector position, in the first selector position the regulating organ permitting the flow of fuel between the second inlet and second outlet of the selector valve through a first orifice in the regulating organ calibrated for the first fuel and also permitting the flow of fuel between the first inlet and first outlet of the selector valve, in the second selector position the regulating organ permitting the flow of fuel between the second inlet and second outlet of the selector valve through a second orifice in the regulating organ calibrated for the second fuel and also preventing the flow of fuel between the first inlet and first outlet of the selector valve, the second oxygen depletion sensor in fluid communication with the first conduit that couples the first outlet of the control valve with the first inlet of the selector valve.

In one implementation the first fuel is natural gas and the second fuel is liquefied petroleum gas, while in another implementation the first fuel is natural gas and the second fuel is butane.

DETAILED DESCRIPTION

The following description describes embodiments of a dual fuel vent free heater. In the following description, numerous specific details and options are set forth in order to provide a more thorough understanding of the present invention. It will be appreciated, however, by one skilled in the art that the invention may be practiced without such specific details or optional components and that such descriptions are merely for convenience and that such are selected solely for the purpose of illustrating the invention. As such, reference to the figures showing embodiments of the present invention is made to describe the invention and not to limit the scope of the disclosure and claims herein.

Figure 1:
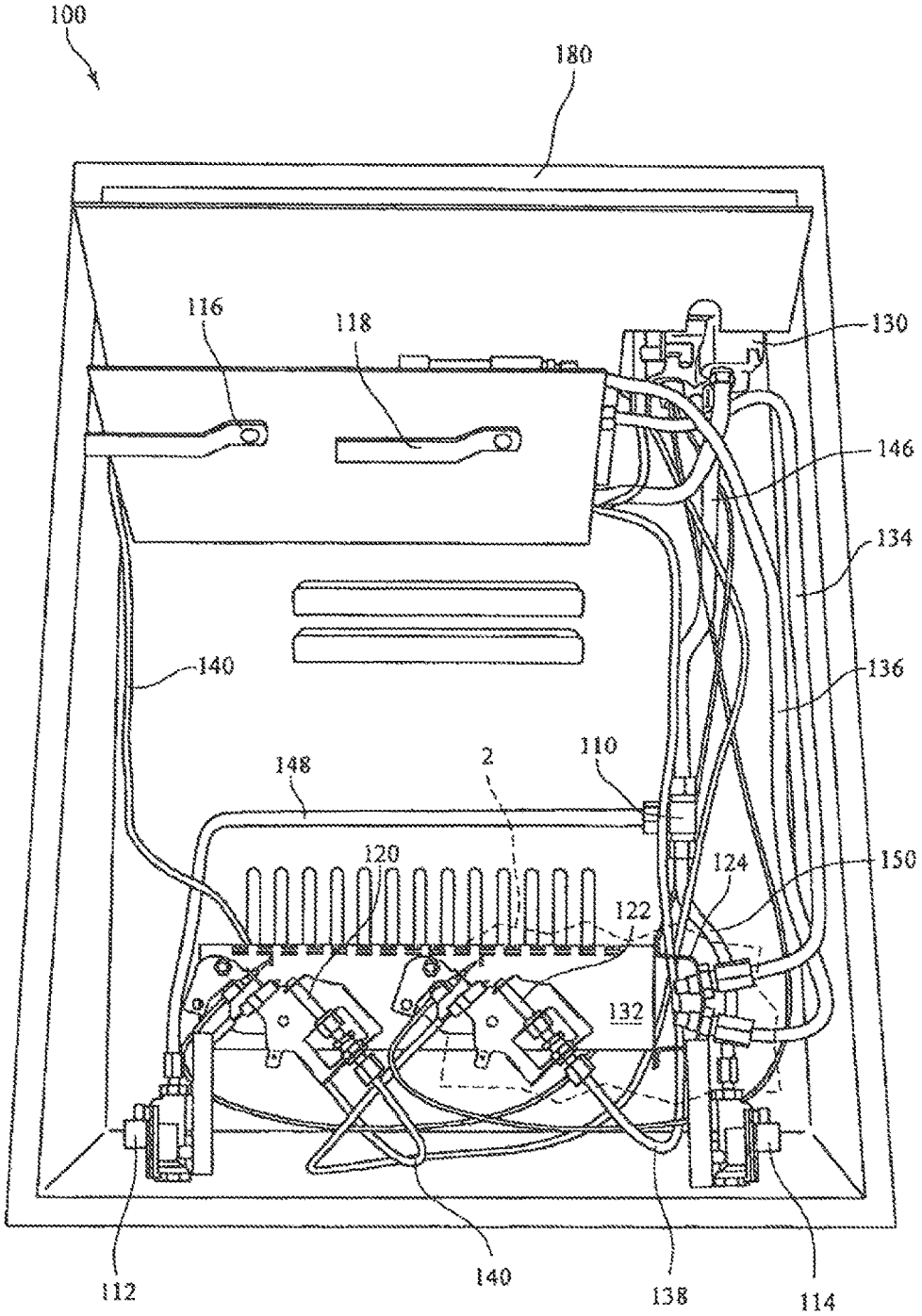
FIG. 1 is a front perspective view of an embodiment of a dual fuel vent free heater showing heater components thereof assembled within a housing.
Figure 2:
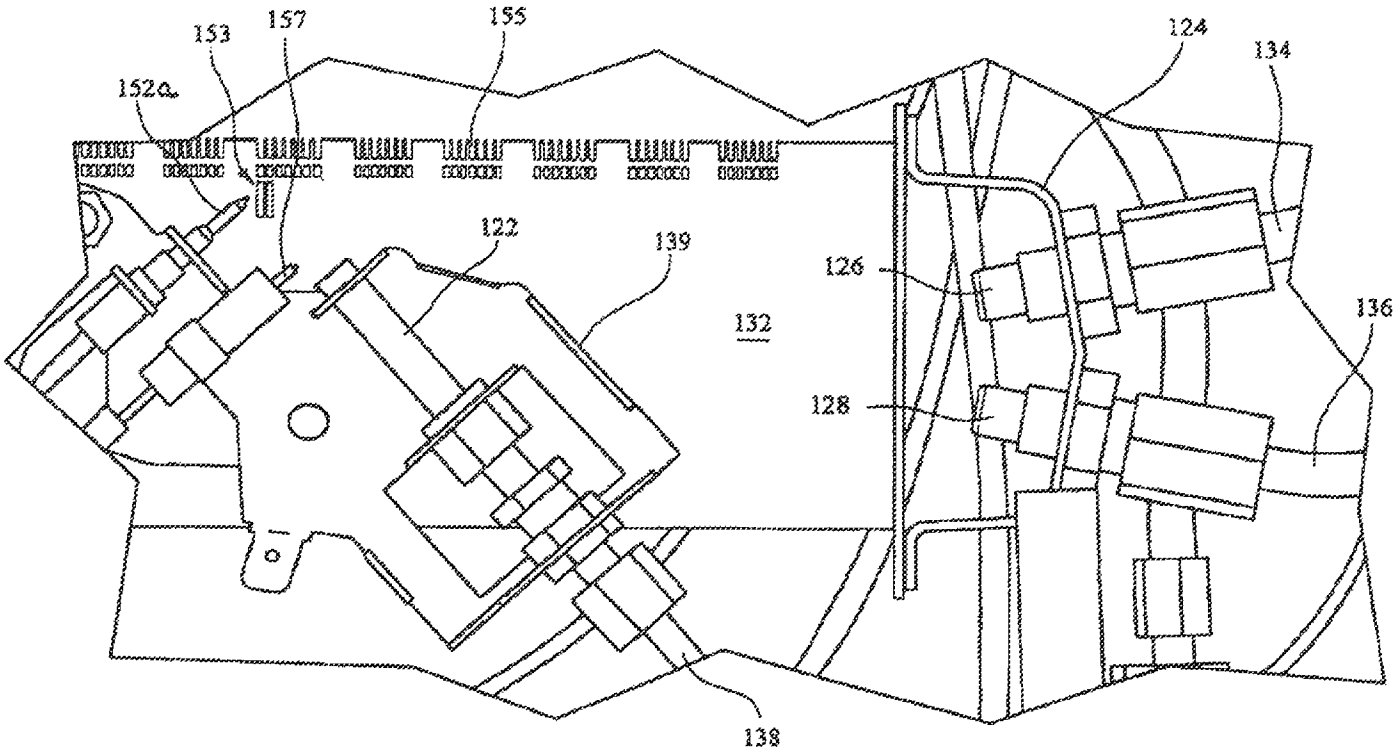
FIG. 2 is a cut-away view of the dual fuel vent free heater of FIG. 1 showing an oxygen detection system.
Figure 3:
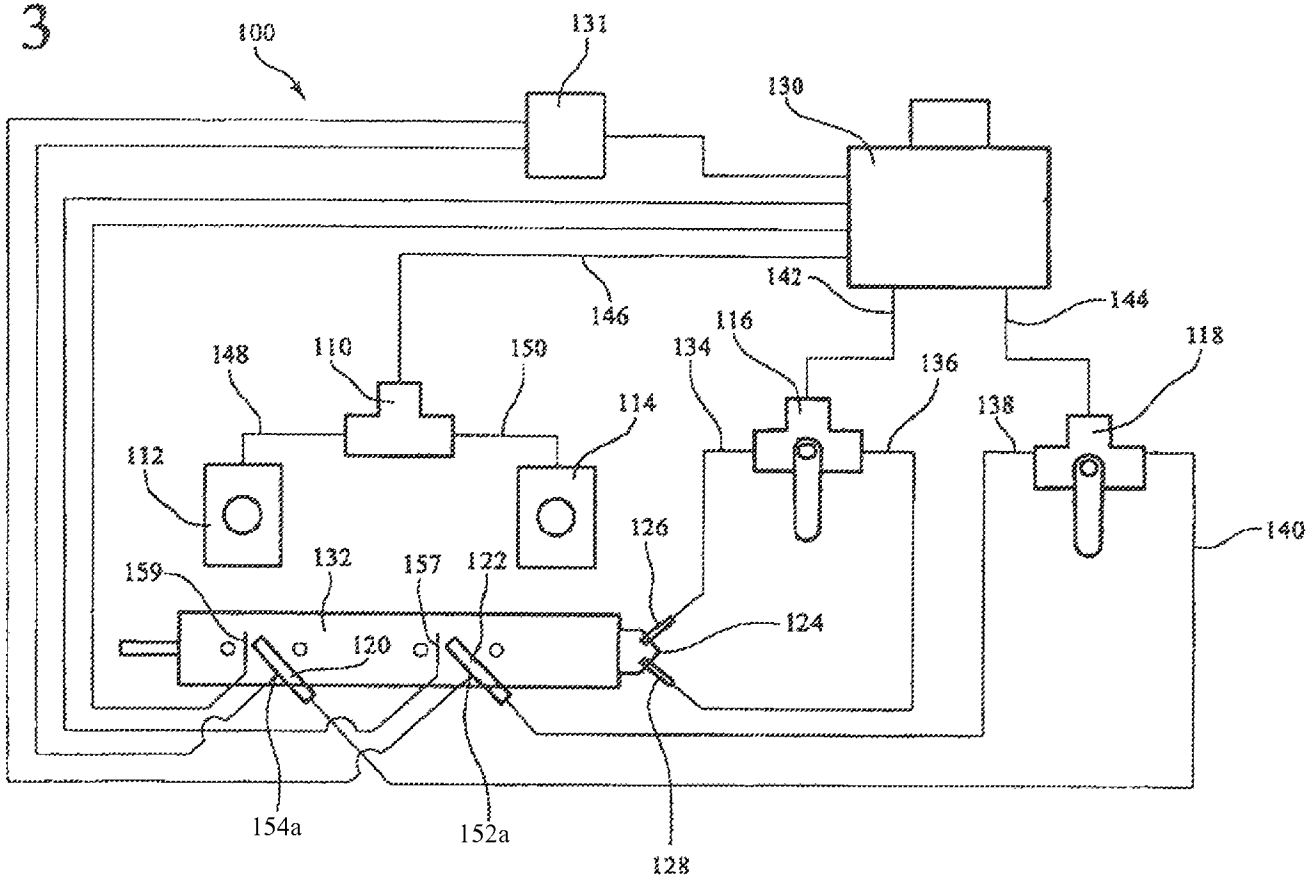
FIG. 3 is a schematic view of the dual fuel vent free heater of FIG. 1 showing flow connection of component parts.

FIGS. 1, 2 and 3 show dual fuel vent free heater 100. FIG. 1 shows the component parts of dual fuel vent free heater 100 in a housing 180 and FIG. 3 shows the flow diagram of heater 100. Dual fuel vent free gas heater 100 comprises a gas burner 132 having a plurality of gas outlet ports 155 (shown in FIG. 2) in an upper surface thereof. It is to be understood that outlet ports 155 may be in a side and/or lower surface of gas burner 132 and gas burner 132 may be situated vertically or angled within housing 180 and still be within the scope of this invention. Gas outlet ports 155 are in flow communication with pilot flame burners 120 and 122. Brackets 139 hold pilot flame burners 120 and 122, piezometric igniters 157 and 159, and temperature sensors 152a and 154a proximate burner 132. Piezometric igniters 157 and 159 are adjacent to pilot flame burners 122 and 120 respectively. Fuel injectors 126 and 128 are in flow communication with the interior portion of gas burner 132. Bracket 124 holds fuel injectors 126 and 128 at an injection angle with respect to a longitudinal axis of gas burner 132 other then 0°. Injectors 126 and 128 are non-concentrically aligned with a burner venturi within burner 132. Bracket 124 controls the angle of each injector with the axis of the burner or venturi. This angle may be varied depending on the size of the burner. Optionally, an oversized venturi may accommodate non-concentric injectors 126 and 128. Preferably, bracket 124 has threaded apertures for accommodation of injectors having a threaded outer annular surface. Preferably, the injection angle of each injector is of the same magnitude. Fuel supply lines 134 and 136 are in flow communication with fuel injectors 126 and 128 respectively. Fuel supply line 134 and injector 126 have a composition and configuration for transporting a fuel such as natural gas or liquid propane at a desired flow rate and fuel supply line 136 and injector 128 have a composition and configuration for transporting a different fuel such as the other of natural gas or liquid propane at a desired flow rate.

FIG. 2 is a cutaway portion of dual fuel vent free heater 100 showing an oxygen detection system. Oxygen detection control system 131, shown schematically in FIG. 3, is in electrical communication with temperature sensors 152a and 154a and thermostatic control 130 wherein thermostatic control 130 has valves controlling the flow of fuels to injectors 126 and 128 and pilot flame burners 120 and 122. The term "thermostatic control" is used broadly throughout this specification and is not limited to controls having a temperature sensing component. Rather, the term encompasses a broad range of controls that may be implementable into a dual fuel heater, including, but not limited to, controls having a temperature sensing component as well as control s that are manually or electrically activated. Oxygen detection control system 131 sends an electrical signal to thermostatic control 130 directing thermostatic control 130 to close the valves shutting off the flow of fuel when a temperature sensor 152a or 154a indicates a temperature less than a control temperature thereby indicating a low oxygen level condition.

Dual fuel vent free gas heater 100 comprises two regulators 112 and 114 in flow communication with "T" connector 110 via fuel lines 148 and 150 respectively. Fuel line 146 extends from "T" connector 110 to thermostatic control 130. Pilot line 144 leads from thermostatic control 130 to pilot control valve 118. Injector line 142 leads from thermostatic control 130 to injector control valve 116. Fuel lines 138 and 140 lead from pilot control valve 118 to pilot flame burners 122 and 120 respectively. Fuel lines 136 and 134 lead from injector control valve 116 to injectors 126 and 128 respectively. Control valves 118 and 116 are manually adjusted for the fuel type being connected to regulator 112 or 114. Typically control valves 118 and 116 each have a setting for natural gas and a setting for liquid propane gas and are adjusted according to the fuel connected to regulator 112 or 114.

Figure 4:
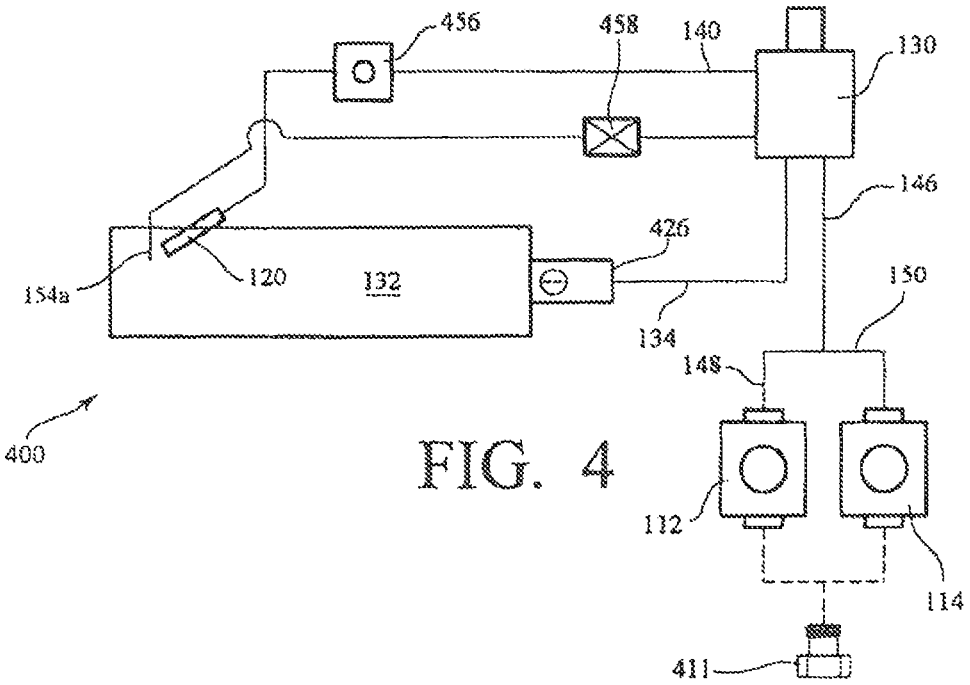
FIG. 4 is a schematic view of a dual fuel vent free heater having a single multiuse injector and a thermal switch.

FIG. 4 shows a schematic view of dual fuel vent free heater 400 having a single burner 132 and a thermal switch 458. Gas burner 132 has a plurality of gas outlet ports. Fuel injector 426 is in flow communication with fuel supply line 134 and an interior of gas burner 132. Fuel injector 426 has a manual control valve therein for controlling the flow of a fuel to burner 132. Injector 426 has at least two settings for adjustment to alternate between at least two different fuels being fed from regulator 112 or regulator 114 through fuel supply line 134. Fuel supply line 134 is in flow communication with thermostatic control 130. Fuel line 140 is in flow communication with thermostatic control 130 and pilot burner 120 and has regulator 456 inline therewith. Regulators 114 and 112 each have back flow prevention systems or a plug 411 allowing a single fuel tank to be connected to either regulator leaving the other regulator without a fuel source. Regulators 112 and 114 are each in flow communication with a "T" connector via fuel lines 148 and 150 respectively. Fuel inlet line 146 extends from the "T" connector and feeds into thermostatic control 130. Thermal switch 458 is in electrical communication with thermostatic control 130 and temperature sensor 154a. Temperature sensor 154a is in proximity to pilot burner 120 and primary burner 132 as shown. Thermal switch 458 sends an electrical signal to thermostatic control 130 shutting off fuel flow to fuel supply line 134 and pilot burner supply line 140 in the event that an incorrect setting is made with injector 426 with respect to the fuel being fed to regulator 112 or 114 by measuring a high temperature condition via temperature sensor 154a at burner 132.

In an alternative embodiment thermal switch 458 is still in electrical communication with thermostatic control 130 and temperature sensor 154a, but does not measure a high temperature condition via temperature sensor 154a. Rather, thermal switch 458 has internal temperature sensing and is appropriately positioned in dual fuel vent free heater 400 to measure a high temperature condition. For example, thermal switch 458 may be a normally closed switch that is opened upon expansion of one or more metals, such as a snap disc, caused by a set temperature being reached. In this alternative embodiment, communication between temperature sensor 154a and thermostatic control 130 is ceased when the wrong fuel type is introduced and a high temperature condition is measured via thermal switch 458, causing the supply of gas to be shut off by thermostatic control 130.

Figure 5:
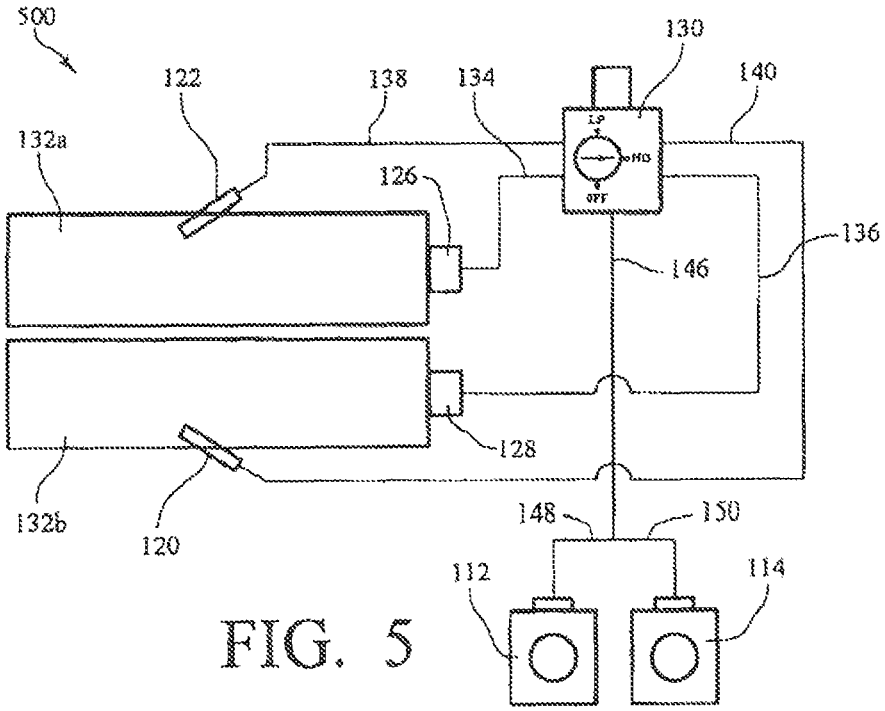
FIG. 5 is a schematic view of a dual fuel vent free heater having a dual burner configuration.

FIG. 5 shows dual fuel vent free heater 500 having a dual burner configuration. Two regulators 112 and 114 are in flow communication with a "T" connector via fuel lines 148 and 150 respectively. Fuel line 146 extends from the "T" connector to thermostatic control 130. Pilot burner supply lines 138 and 140 lead from thermostatic control 130 to pilot flame burners 122 and 120 respectively. Fuel injector lines 134 and 136 lead from thermostatic control 130 to injectors 126 and 128 respectively. Burner 132a has first pilot flame burner 122 proximate gas outlet apertures therein and injector 126 proximate an axial opening. Burner 132b has pilot flame burner 120 proximate gas outlet apertures and injector 128 proximate an axial opening therein.

Figure 6:
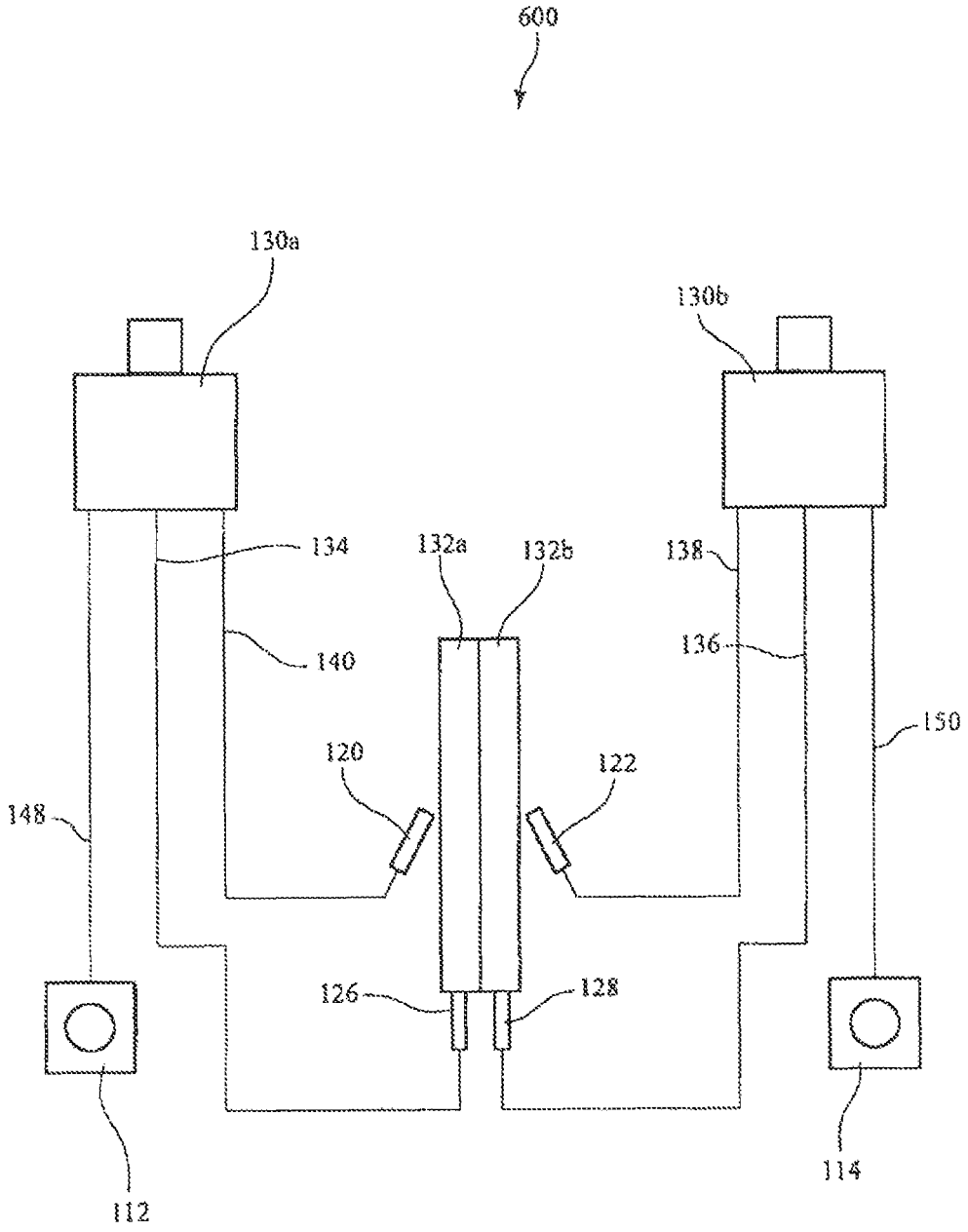
FIG. 6 is a schematic view of a dual fuel vent free heater having a dual burner and dual thermostatic control configuration.

FIG. 6 is a schematic view of a dual fuel vent free heater 600 having a dual burner and dual thermostatic control configuration. Regulator 112 is in flow communication with thermostatic control 130a via fuel line 148. Regulator 114 is in flow communication with thermostatic control 130b via fuel line 150. Pilot supply line 140 leads from thermostatic control 130a to pilot flame burner 120 and pilot supply line 138 leads from thermostatic control 130b to pilot flame burner 122. Injector supply line 134 leads from thermostatic control 130a to fuel injector 126. Injector supply line 136 leads from thermostatic control 130b to fuel injector 128. Burner 132a has pilot flame burner 120 proximate gas outlet apertures and fuel injector 126 proximate an axial opening. Burner 132b has pilot flame burner 122 proximate gas outlet apertures and fuel injector 128 proximate an axial opening therein.

Figure 7:
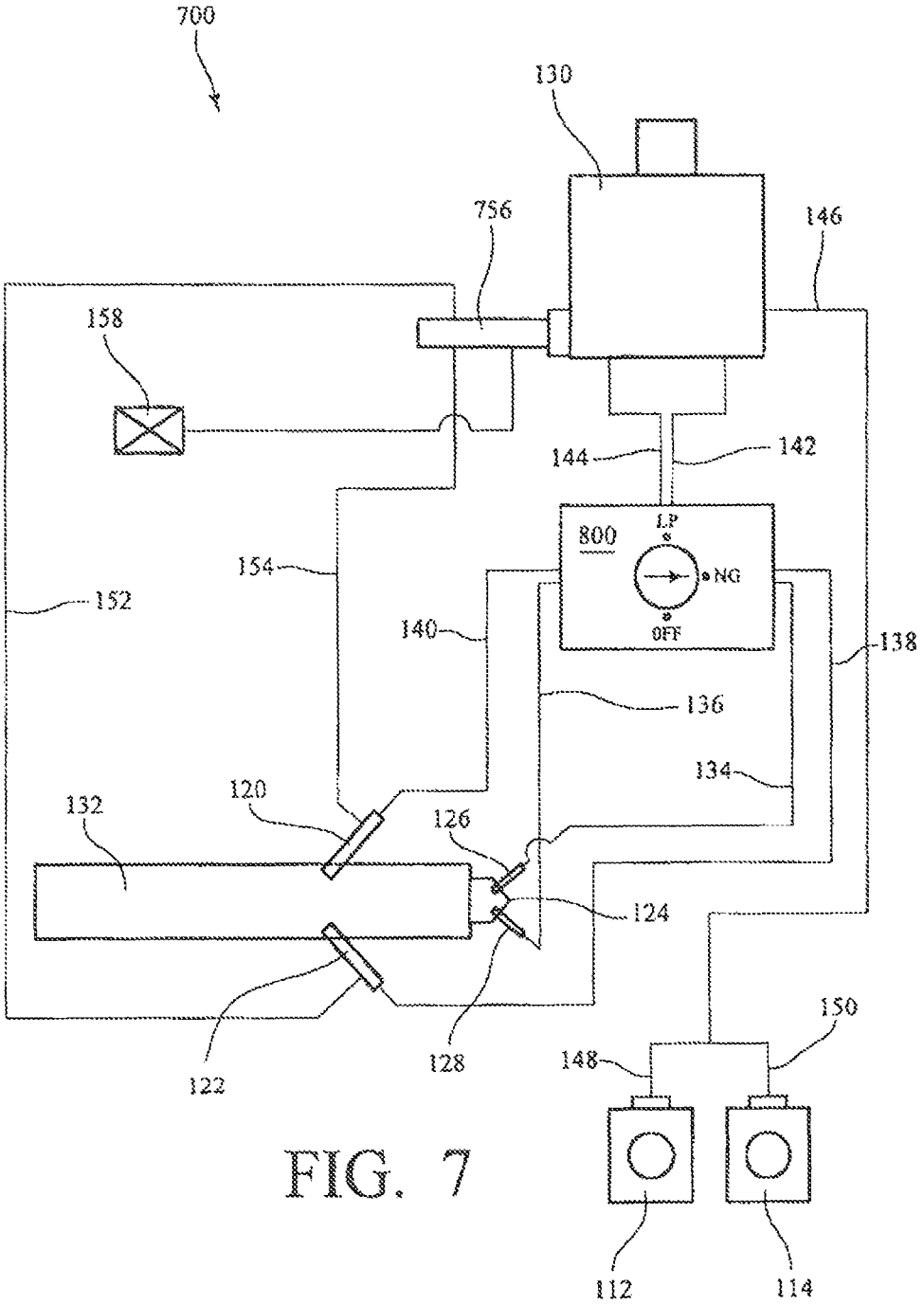
FIG. 7 is a schematic view of a dual fuel vent free heater having a multi-positional manual control valve, a thermal switch, and a thermostatic control valve.

FIG. 7 shows a schematic view of dual fuel vent free heater 700 having a multi-positional manual control valve 800. Regulators 112 and 114 are in flow communication with a "T" connector via fuel lines 148 and 150 respectively. Fuel line 146 extends from the "T" connector to thermostatic control 130. Pilot line 142 and injector line 144 lead from thermostatic control 130 to multi-positional manual control valve 800. Multi-positional manual control valve 800 directs flow from pilot line 142 and injector line 144 to pilot supply line 140 and injector supply line 136, or pilot supply line 138 and injector supply line 134, or blocks the flow from pilot line 142 and injector line 144. Burner 132 has injectors 126 and 128 held at an angle to the burner axis in proximity to the burner opening with bracket 124. Pilot burners 120 and 122 are proximate the outer surface of burner 132 and are in flow communication with pilot supply line 140 and 138 respectively. Thermal switch 158 is in electrical communication with T/C block 756. T/C block 756 is in electrical communication with a temperature sensor 152a, 154a proximate each pilot burner 120 and 122 and primary burner 132, via T/C lines 154 and 152, and thermostatic control 130. In the event an incorrect setting is made with respect to the fuel being fed to the correct injector and pilot burner, thermal switch 158 or thermostatic control 130 shuts off the flow of gas to heater 700 by reading of a high temperature condition near burner 132.

Figures 8, 8A, 8B:
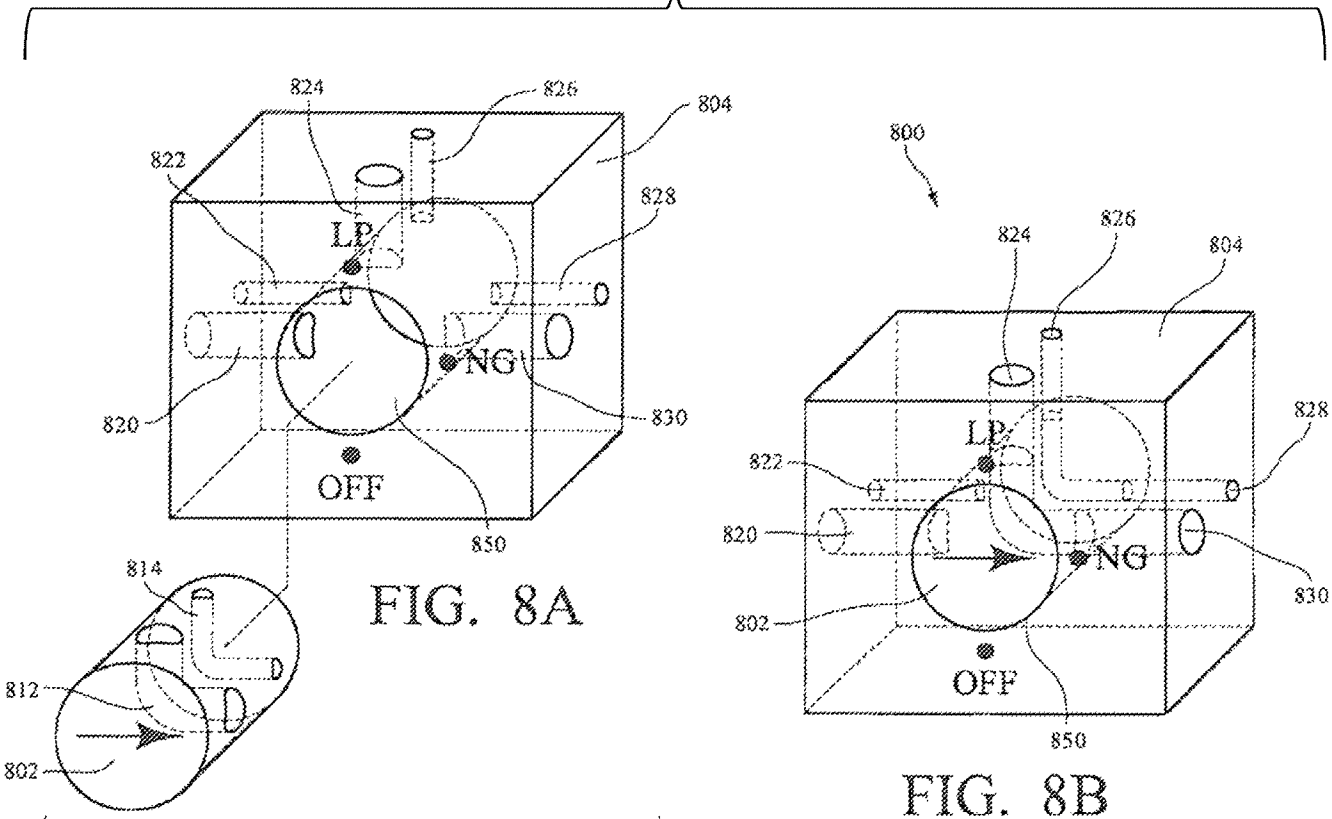
FIG. 8, which includes and is defined by sub-part FIGS. 8A and 8B, provides blow-up views of the multi-positional manual control valve of FIG. 7.

FIG. 8 which includes and is defined by sub-part FIGS. 8A and 8B shows a blow-up view of multi-positional manual control valve 800. Multi-positional manual control valve 800 comprises a control block 804 and a control cylinder 802. Control block 804 has a cylindrical aperture 850 extending from a front surface to a rear surface. The front surface of control 800 has fuel selection and cut off indicators LP, NG, and OFF. Three fuel injector apertures 820, 824 and 830 extend from cylindrical aperture 850 at about 90° intervals to a left side, top, and right side of control block 804. A pilot aperture is axially aligned about cylindrical aperture 850 with each fuel injector aperture, pilot aperture 822 is axial aligned with injector aperture 820, pilot aperture 826 is axial aligned with injector aperture 824, and pilot aperture 828 is axial aligned with injector aperture 830. Control cylinder 802 has an outer circumference proximate the circumference of cylindrical aperture 850 in control block 804 wherein control cylinder 802 is closely received within. Control cylinder 802 has "L" shaped flow through fuel injector aperture 812 and an axially aligned "L" shaped flow through pilot aperture 814. Control cylinder 802 has a first, second, and third, position within the cylindrical aperture in control block 804. The front surface of control cylinder 802 has a selection arrow pointing to an appropriate indicator on the front surface of control block 804. At a first position, fuel injector aperture 820 and pilot aperture 822 are in flow communication with fuel injector aperture 824 and pilot aperture 826. At a second position, as shown in FIG. 8B, fuel injector aperture 824 and pilot aperture 826 are in flow communication with fuel injector aperture 830 and pilot aperture 828. At the third position, one end of the "L" shaped flow through fuel injector aperture 812 and axially aligned "L" shaped flow through pilot aperture 814 are blocked by the wall of cylindrical aperture 850 in control block 804 cutting off the flow of fuel.

Figure 9:
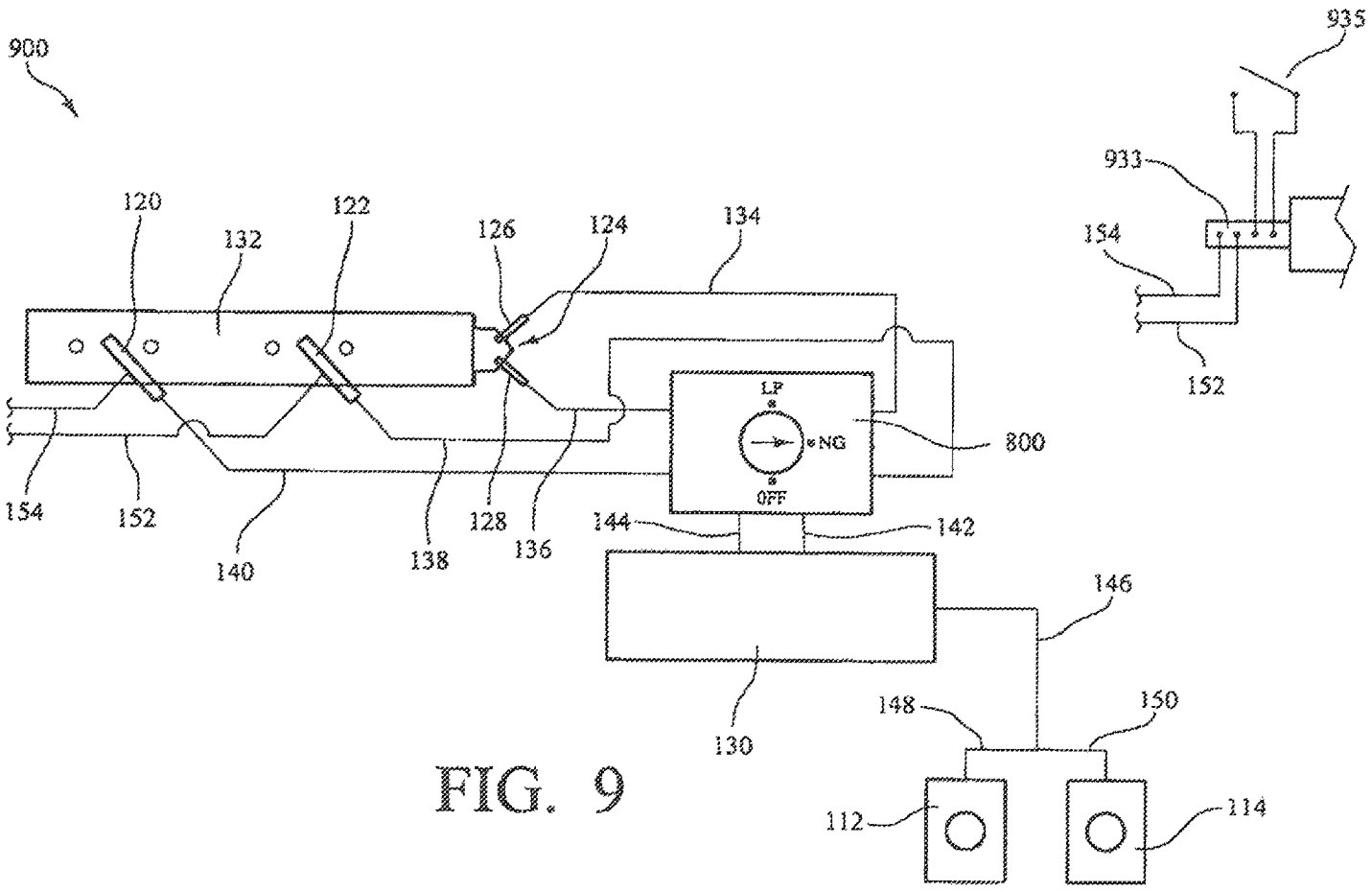
FIG. 9 is a schematic view of a dual fuel vent free heater having a multi-positional manual control valve, a thermal switch, a thermostatic control valve, and pilot burners aligned on a similar side of a burner.

FIG. 9 shows a schematic view of dual fuel vent free heater 900. Dual fuel vent free heater 900 comprises two regulators 112 and 114 in flow communication with a "T" connector via fuel lines 148 and 150. Fuel line 146 extends from the "T" connector to thermostatic control 130. A pilot line 142 and an injector line 144 lead from thermostatic control 130 to multi-positional manual control valve 800. Multi-positional manual control valve 800 has a first, second, and third control position as indicated with LP, NG, and OFF. The first control position creates a flow communication between the pilot line 144 and injector line 142 leading from thermostatic control 130 with pilot flame burner 120 and injector 128 through pilot feed line 140 and injector feed line 136 respectively. The second control position creates a flow communication between pilot line 144 and injector line 142 leading from thermostatic control 130 with pilot flame burner 122 and injector 126 respectively. The third position cuts off fuel flow from pilot line 144 and injector line 142 leading from thermostatic control 130. Thermal switch 935 is in electrical communication with a temperature sensor proximate pilot flame burners 120 and 122 and primary burner 132 as shown via electrical connectors 154 and 152 respectively through thermo control block (T/C block) 933. Thermal switch 935 sends a shut off signal to thermostatic control 130 when a first set temperature is exceeded in burner 132 indicating a wrong fuel setting and cutting off the flow of fuel to heater 900. Embodiments incorporating this safety shut-off feature and the safety shut-off feature shown in FIG. 2 and previously described, shutting off fuel flow to the gas heater in the event a set temperature is exceeded, provide complete fuel shut-off functionality.

Figure 16:
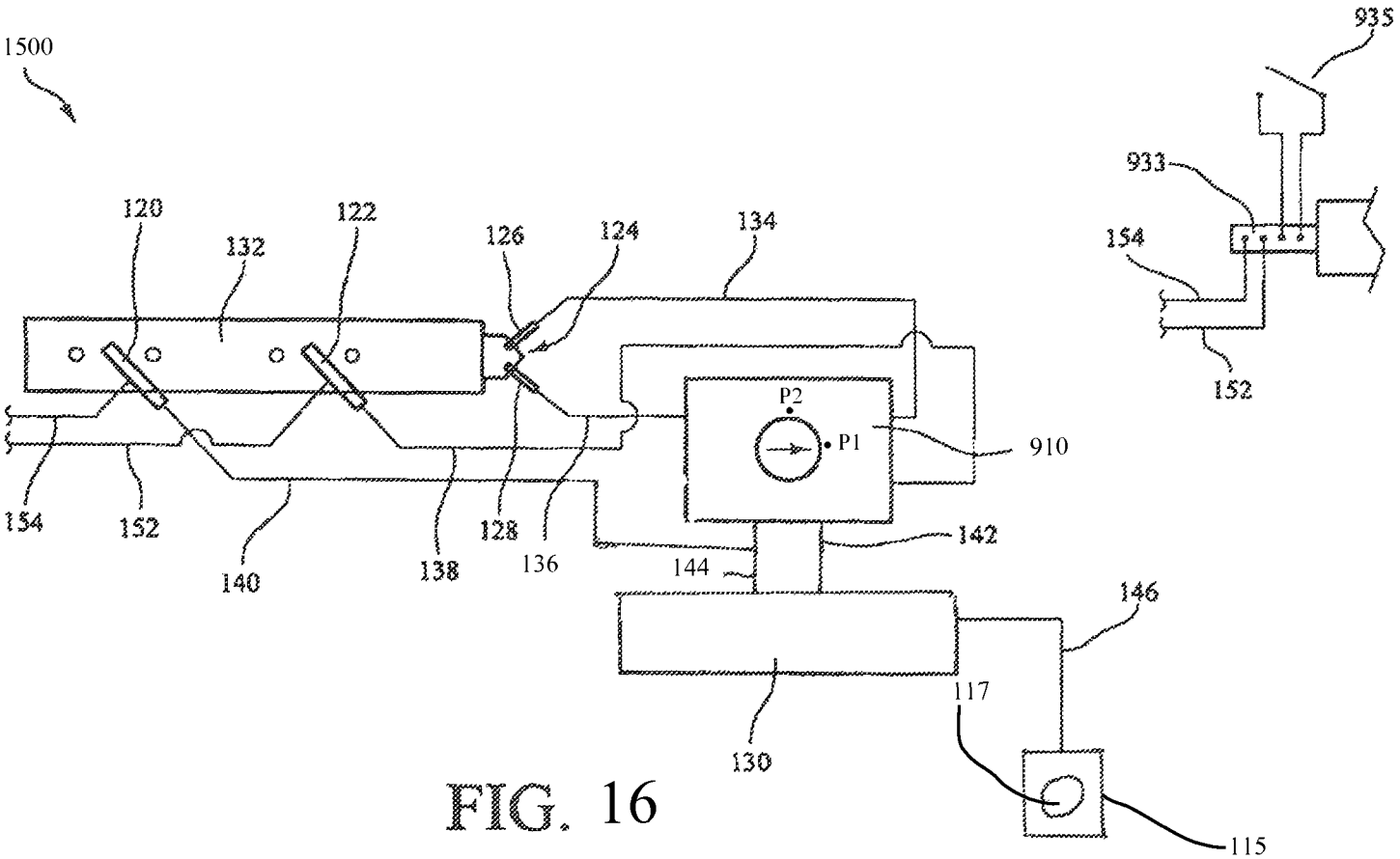
FIG. 16 is a schematic view of a dual fuel vent free heater according to another implementation.

FIG. 16 shows a schematic view of a dual fuel vent free heater 1500. Dual fuel vent free heater 1500 comprises a single pressure regulator 115 in flow communication with thermostatic control 130 via fuel line 146. A pilot line 144 and an injector line 142 lead from thermostatic control 130 to multi-positional manual control valve 910. Multi-positional manual control valve 910 has at least first and second control position as indicated with P1 and P2. The first control position P1 creates a flow communication between the pilot line 144 and injector line 142 leading from thermostatic control 130 with pilot flame burner 122 and injector 126 through pilot feed line 138 and injector feed line 134, respectively. The second control position P2 creates a flow communication between injector line 142 leading from thermostatic control 130 with injector 128 through injector feed line 136. When in the second control position P2 flow communication between pilot line 144 and pilot flame burner 122 is prevented. When the selector valve 910 is in both the first control position P1 and the second control position P2 flow communication between the thermostatic control valve 130 and pilot flame burner 120 is maintained through pilot feed line 140. In one implementation thermal switch 935 is in electrical communication with a temperature sensor proximate pilot flame burners 120 and 122 and primary burner 132 as shown via electrical connectors 154 and 152, respectively, through thermo control block (T/C block) 933. Thermal switch 935 sends a shut off signal to thermostatic control 130 when a first set temperature is exceeded in burner 132 indicating a wrong fuel setting and cutting off the flow of fuel to heater 1500. Embodiments incorporating this safety shut-off feature and the safety shut-off feature shown in FIG. 2 and previously described, shutting off fuel flow to the gas heater in the event a set temperature is exceeded, provide complete fuel shut-off functionality.

In one implementation the single pressure regulator 115 has a single fuel inlet and a single fuel outlet and is adapted to regulate the pressure at the single fuel outlet of a first fuel delivered at the single fuel inlet at a first pressure or a second fuel delivered at the single fuel inlet at a second pressure. In one implementation the pressure regulator is equipped with a selector 117 that is moveable between at least first and second positions. When in the first position the pressure regulator 115 is adapted to regulate the pressure at the single fuel outlet of the first fuel and when in the second position the pressure regulator 115 is adapted to regulate the pressure at the single fuel outlet of the second fuel. In one implementation the first fuel is natural gas and the second fuel is liquefied propane gas, while in another implementation the first fuel is natural gas and the second fuel is butane. In one implementation the pressure regulator 115 comprises a dual gas pressure regulator like that disclosed in U.S. Pat. No. 7,600,529 which is incorporated herein by reference in its entirety.

As previously discussed, the pilot flame burners 120 and 122 each form a part of an oxygen depletion sensor that include temperature sensors 152a and 154a, respectively. Each of the pilot flame burners 120 and 122 is also associated with a piezometric igniter 157 and 159, respectively. According to one implementation, pilot flame burner 122 comprises a first injector at an inlet thereof adapted for the introduction of natural gas while pilot flame burner 120 comprises a second injector at an inlet thereof adapted for the introduction of liquefied propane gas. According to another implementation, pilot flame burner 122 comprises a first injector at an inlet thereof adapted for the introduction of natural gas while pilot flame burner 120 comprises a second injector at an inlet thereof adapted for the introduction of butane. In one implementation, because pilot flame burner 120 is situated to receive a fuel whenever a fuel flow is established through the thermostatic control valve 130, piezometric igniter 157 is activated each time piezometric igniter 159 is activated.

Figure 17:
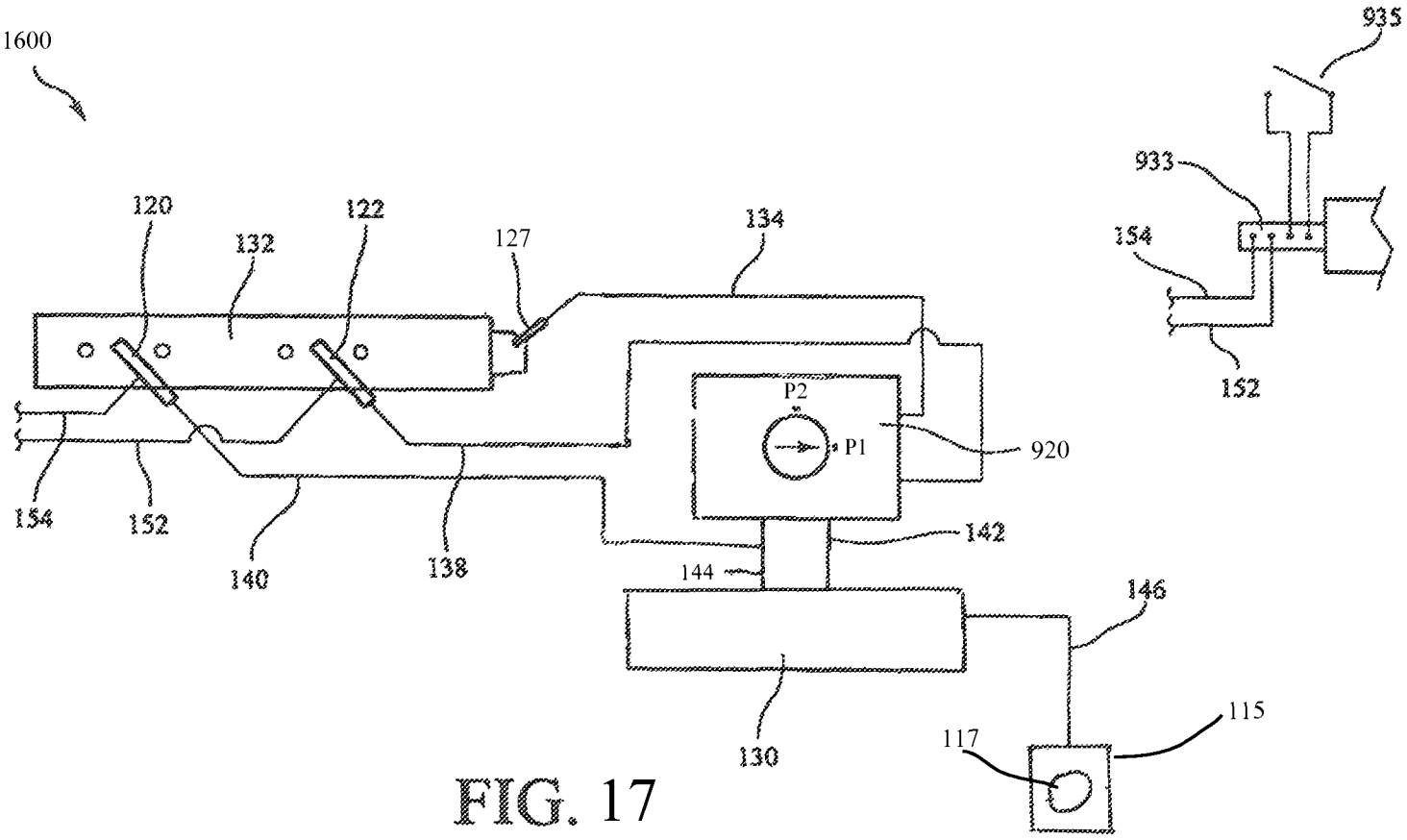
FIG. 17 is a schematic view of a dual fuel vent free heater according to another implementation.

FIG. 17 shows a schematic view of a dual fuel vent free heater 1600. Dual fuel vent free heater 1600 comprises a single pressure regulator 115 in flow communication with thermostatic control 130 via fuel line 146. A pilot line 144 and an injector line 142 lead from thermostatic control 130 to multi-positional manual control valve 920. Multi-positional manual control valve 920 has at least first and second control position as indicated with P1 and P2. The first control position P1 creates a flow communication between the pilot line 144 and injector line 142 leading from thermostatic control 130 with pilot flame burner 122 and injector 127 through pilot feed line 138 and injector feed line 134, respectively. The second control position P2 creates a flow communication between injector line 142 leading from thermostatic control 130 with injector 127 through injector feed line 134. When in the second control position P2 flow communication between pilot line 144 and pilot flame burner 122 is prevented. When the selector valve 920 is in both the first control position P1 and the second control position P2 flow communication between the thermostatic control valve 130 and pilot flame burner 120 is maintained through pilot feed line 140.

In one implementation the manual control valve 920 comprises a regulating organ having at least a first orifice and a second orifice, the first orifice calibrated for the delivery of a first fuel (e.g., natural gas) to the main burner fuel injector 127, the second orifice calibrated for the delivery of a second fuel (e.g., liquefied petroleum gas, butane, etc.) to fuel injector 127. In such an implementation when the manual control valve 920 is in the first control position P1, flow communication between fuel lines 142 and 134 is established through the first orifice and when the manual control valve 920 is in the first control position P1, flow communication between fuel lines 142 and 134 is established through the second orifice.

In one implementation thermal switch 935 is in electrical communication with a temperature sensor proximate pilot flame burners 120 and 122 and primary burner 132 as shown via electrical connectors 154 and 152, respectively, through thermo control block (T/C block) 933. Thermal switch 935 sends a shut off signal to thermostatic control 130 when a first set temperature is exceeded in burner 132 indicating a wrong fuel setting and cutting off the flow of fuel to heater 1600. Embodiments incorporating this safety shut-off feature and the safety shut-off feature shown in FIG. 2 and previously described, shutting off fuel flow to the gas heater in the event a set temperature is exceeded, provide complete fuel shut-off functionality.

In one implementation the single pressure regulator 115 has a single fuel inlet and a single fuel outlet and is adapted to regulate the pressure at the single fuel outlet of a first fuel delivered at the single fuel inlet at a first pressure or a second fuel delivered at the single fuel inlet at a second pressure. In one implementation the pressure regulator is equipped with a selector 117 that is moveable between at least first and second positions. When in the first position the pressure regulator is adapted to regulate the pressure at the single fuel outlet of the first fuel and when in the second position the pressure regulator is adapted to regulate the pressure at the single fuel outlet of the second fuel. In one implementation the first fuel is natural gas and the second fuel is liquefied propane gas, while in another implementation the first fuel is natural gas and the second fuel is butane. In one implementation the pressure regulator 115 comprises a dual gas pressure regulator similar to that disclosed in U.S. Pat. No. 7,600,529 which is incorporated herein by reference in its entirety.

As previously discussed, the pilot flame burners 120 and 122 each form a part of an oxygen depletion sensor that include temperature sensors 152a and 154a, respectively. Each of the pilot flame burners 120 and 122 is also associated with a piezometric igniter 157 and 159, respectively. According to one implementation, pilot flame burner 122 comprises a first injector at an inlet thereof adapted for the introduction of natural gas while pilot flame burner 120 comprises a second injector at an inlet thereof adapted for the introduction of liquefied propane gas. According to another implementation, pilot flame burner 122 comprises a first injector at an inlet thereof adapted for the introduction of natural gas while pilot flame burner 120 comprises a second injector at an inlet thereof adapted for the introduction of butane. Because pilot flame burner 120 is situated to receive a fuel whenever a fuel flow is established through the thermostatic control valve 130, piezometric igniter 157 is activated each time piezometric igniter 159 is activated.

Figure 10:
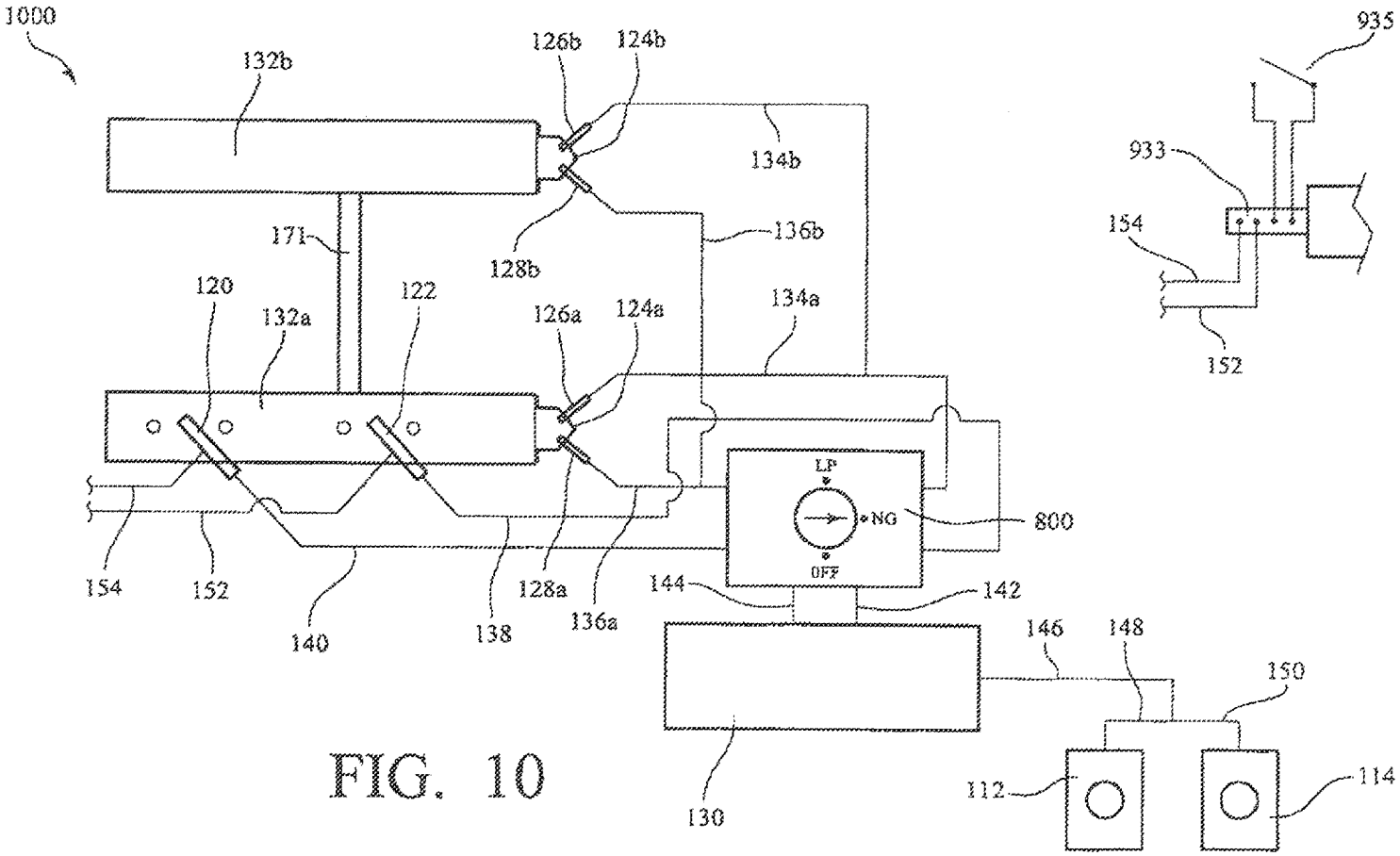
FIG. 10 is schematic view of the dual fuel vent free heater having a first burner, a second burner, and a cross-over burner for use in a vent free fireplace unit.

FIG. 10 shows a schematic view of dual fuel vent free heater 1000 having burner 132a, 132b, and cross-over burner 171. Such a configuration provides a blue flame burner and a yellow flame burner as is often desirable in a vent free fireplace heater. The configuration of heater 1000 is similar to the configuration of heater 900 with the addition of burners 132b, cross-over burner 171, two fuel line "T" connectors, and fuel injectors 126b and 128b. Crossover burner 171 is in flow communication with burners 132a and 132b. Burner 132b has fuel injectors 126b and 128b held by bracket 124b proximate an axial end and is situated substantially parallel burner 132a. Fuel supply line 134b feeds injector 126b with a "T" connector in t10w communication with fuel supply line 134a. Fuel supply line 136b feeds injector 128b with a "T" connector in flow communication with fuel supply line 136a. The statement: "Two burners or parts of burners that are in flow communication with each other" implies either that there is an opening or a connection between the two burners that allows a gas to flow from one to the other, or that some of the openings in each burner are in close proximity with each other to allow the burning gasses from one burner to ignite the gasses emanating from the other.

Figure 11:
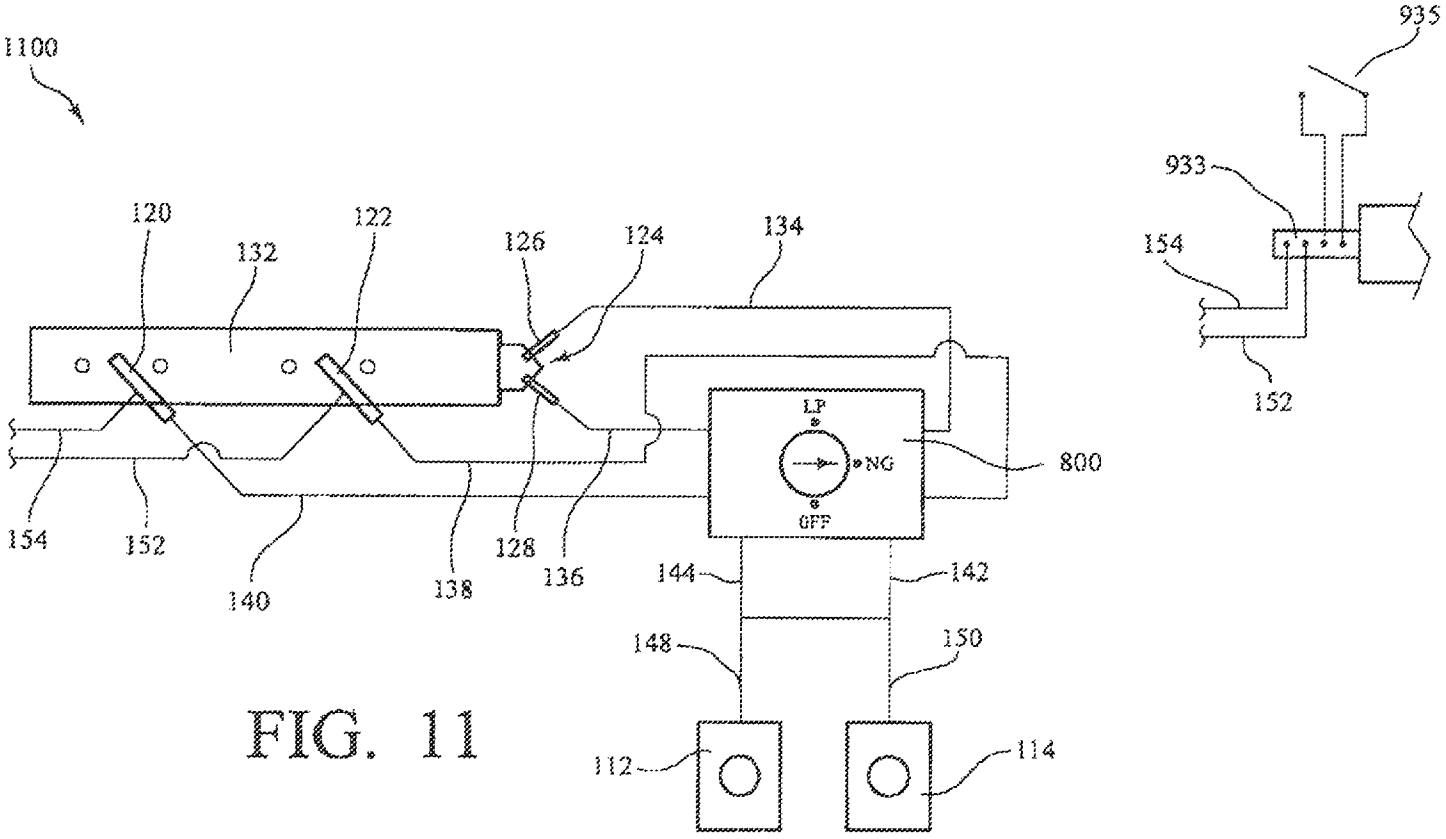
FIG. 11 is a schematic view of a dual fuel vent free heater having a multi-positional manual control valve directly controlling the flow of fuel into the heater.

FIG. 11 is a schematic view of dual fuel vent free heater 1100 having a multi-positional manual control valve 800 directly controlling the flow of fuel into heater 1100. The configuration of heater 1100 is similar to that of heater 900 but does not have thermostatic control 130. Rather, fuel from either regulator 112 or regulator 114 is fed through fuel line 148 or 150. Fuel lines 148 and 150 "T" into pilot line 142 and injector line 144 which lead directly to multi-positional manual control valve 800. Therefore, the amount of heat produced by heater 1100 is manually controlled with multi-positional manual control valve 800 without any thermostatic control.

Figure 12:
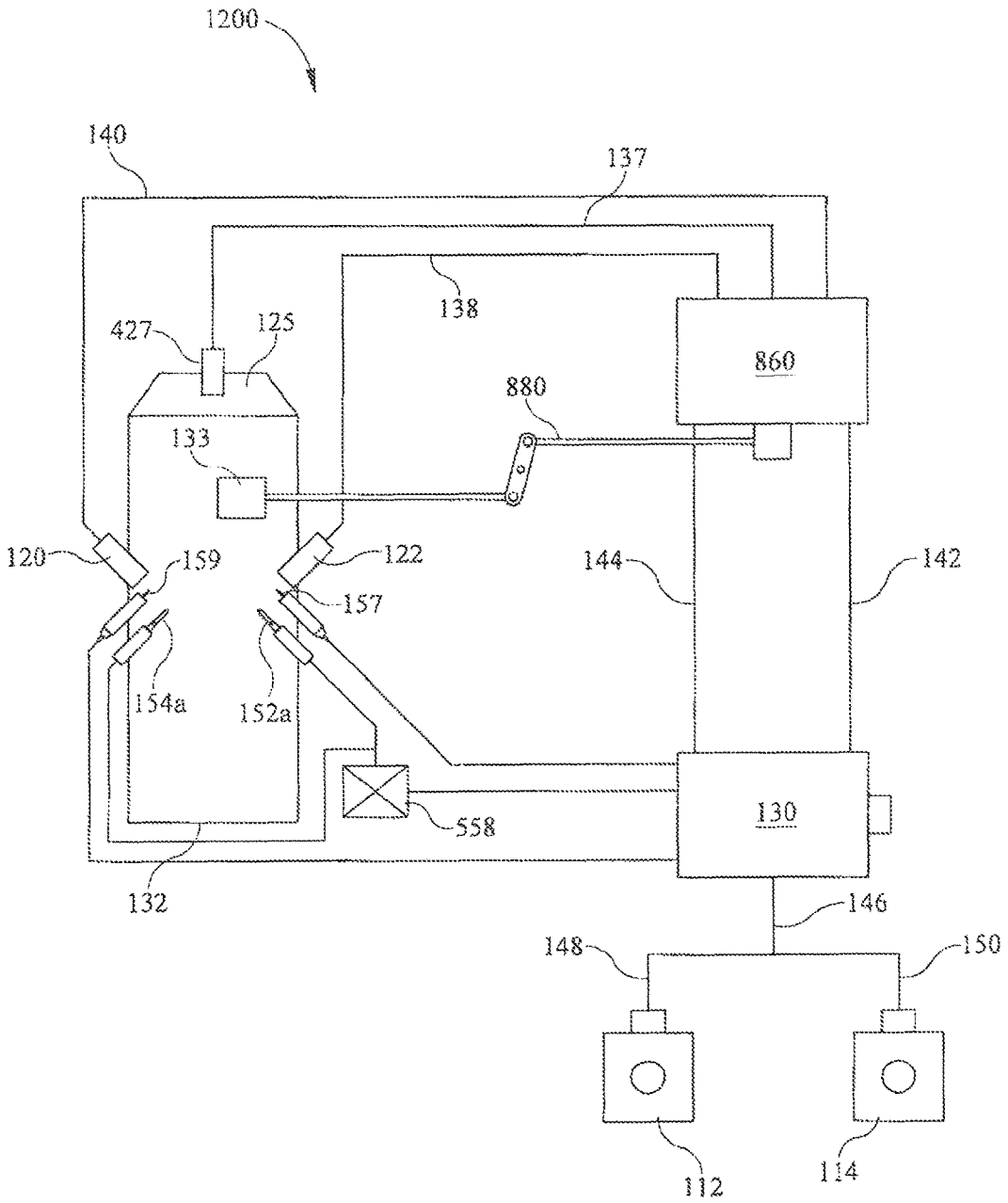
FIG. 12 is a schematic view of a dual fuel vent free heater having a multi-positional manual control valve, a thermal switch, a thermostatic control valve, a single fuel injector, linkage, and pilot burners aligned on opposite sides of a burner.

FIG. 12 shows a schematic view of dual fuel vent free heater 1200 having a multi-positional manual control valve 860. The word "manual" in "multi-positional manual control valve" is not meant to limit multi-positional manual control valve 860 or other control valves mentioned herein to being actuated manually. Rather, as understood in the art, multi-positional manual control valve may encompass a number of control valves, such as those that are electronically or otherwise actuated. Regulators 112 and 114 are in flow communication with a "T" connector to thermostatic control 130 via fuel lines 148 and 150 respectively. Fuel line 146 extends from "T" connector to thermostatic control 130. Pilot line 142 and injector line 144 lead from thermostatic control 130 to multi-positional manual control valve 860. Multi-positional manual control valve 860 preferably has fuel selection indicators LP and NG that correspond to two different positions of multi-positional manual control valve 860. Multi-positional manual control valve 860 directs flow from pilot line 142 to pilot supply line 140 or from pilot line 142 to pilot supply line 138 dependent upon whether the LP or NG position is selected. Additionally, multi-positional manual control valve 860 directs flow from injector line 144 to injector supply line 137 when the NG position is selected, while causing the flow from injector line 144 to injector supply line 137 to be restricted when LP is selected. Flow is restricted by decreasing the size of at least a portion of the orifice internal to multi-positional manual control valve 860 through which flow from injector line 144 to injector supply line 137 proceeds when LP is selected. Multi-positional manual control valve 860 may also be provided with a cut off indicator OFF that corresponds to an optional additional position of multi-positional manual control valve 860. Such an indicator would block the flow from injector line 140 and pilot line 142 if the OFF position is selected. However, it is preferred that thermostatic control 130, instead of multi-positional manual control valve 860, be provided with controls for turning dual fuel vent free heater 1200 off.

Pilot burners 120 and 122 are proximate the outer surface of burner 132 and are in flow communication with pilot supply lines 140 and 138 respectively. Burner 132 has a single injector 427 held in proximity to the burner opening and preferably supported by bracket 125. The flow of fuel through injector 427 is controlled by multi-positional manual control valve 860 when the appropriate fuel selection is made and no separate adjustment to fuel injector 427 is necessary when selecting a different fuel. Piezometric igniters 157 and 159 are adjacent to pilot flame burners 122 and 120, respectively. Temperature sensors 152a and 154a are proximate to pilot flame burners 122 and 120 respectively and are in electrical communication with thermal switch 558, which is in electrical communication with thermostatic control 130.

Temperature sensors 152a and 154a are positioned such that when their respective pilot flame burners are lit with a safe oxygen level present, they will be in contact with or substantially close to the pilot flame to be sufficiently heated and resultantly supply a predetermined voltage through thermal switch 558, if it is in the closed position, to thermostatic control 130. If this voltage is not supplied, the supply of gas to burner 132 and pilot flame burner 120 and 122 will be shut off by thermostatic control 130. This predetermined voltage will not be supplied when an unsafe oxygen level is present, since the pilot flame will no longer be substantially close to its respective temperature sensor 152a or 154a, causing temperature sensor 152a or 154a to be insufficiently heated and supply a voltage less than the predetermined voltage. In this embodiment, thermal switch 558 is preferably a normally closed switch with internal temperature sensing and is positioned in dual fuel vent free heater 1200 such that under normal heater operating conditions, it will reach a temperature that is under its set point. However, if the wrong gas type is introduced and burned in burner 132, it will cause thermal switch 558 to heat to a temperature at or above its set point and be in the open position. This will break the communication between temperature sensors 152a and 154a and thermostatic control 130, causing the supply of gas to injector 427 and pilot flame burners 120 and 122 to be shut off by thermostatic control 130. The wrong gas type may be introduced in burner 132 by, among other things, feeding the wrong fuel to regulator 112 or 114, malfunction of multi-positional manual control valve 860, or by an incorrect setting on a fuel injector with a manual control valve.

Dual fuel vent free heater 1200 of FIG. 12 is also shown with a linkage 880 that interacts with an air shutter 133 and multi-positional manual control valve 860. Linkage 880 adjusts the position of air shutter 133 based upon the selected position of multi-positional manual control valve 860. Air shutter 133 is located proximal to fuel injector 427 and forms part of, or is attached to, or is in close proximity to burner 132. Adjustment of air shutter 133 allows varying amounts of air to be received through an opening in burner 132 for ideal combustion of the selected fuel. For example, in some embodiments linkage 880 could cause air shutter 133 to completely cover the opening in burner 132 when NG is selected by multi-positional manual control valve 860 and to allow the opening in burner 132 to be completely exposed when LP is selected. Dual fuel vent free heater 1200 may also be provided with a linkage (not shown) that blocks the connection to either regulator 112 or 114 dependent upon which fuel is selected by multi-positional manual control valve 860. The linkage would prevent connection to the regulator corresponding with the fuel that is not selected, preferably by blocking or obstructing the input to the given regulator.

Figure 13:
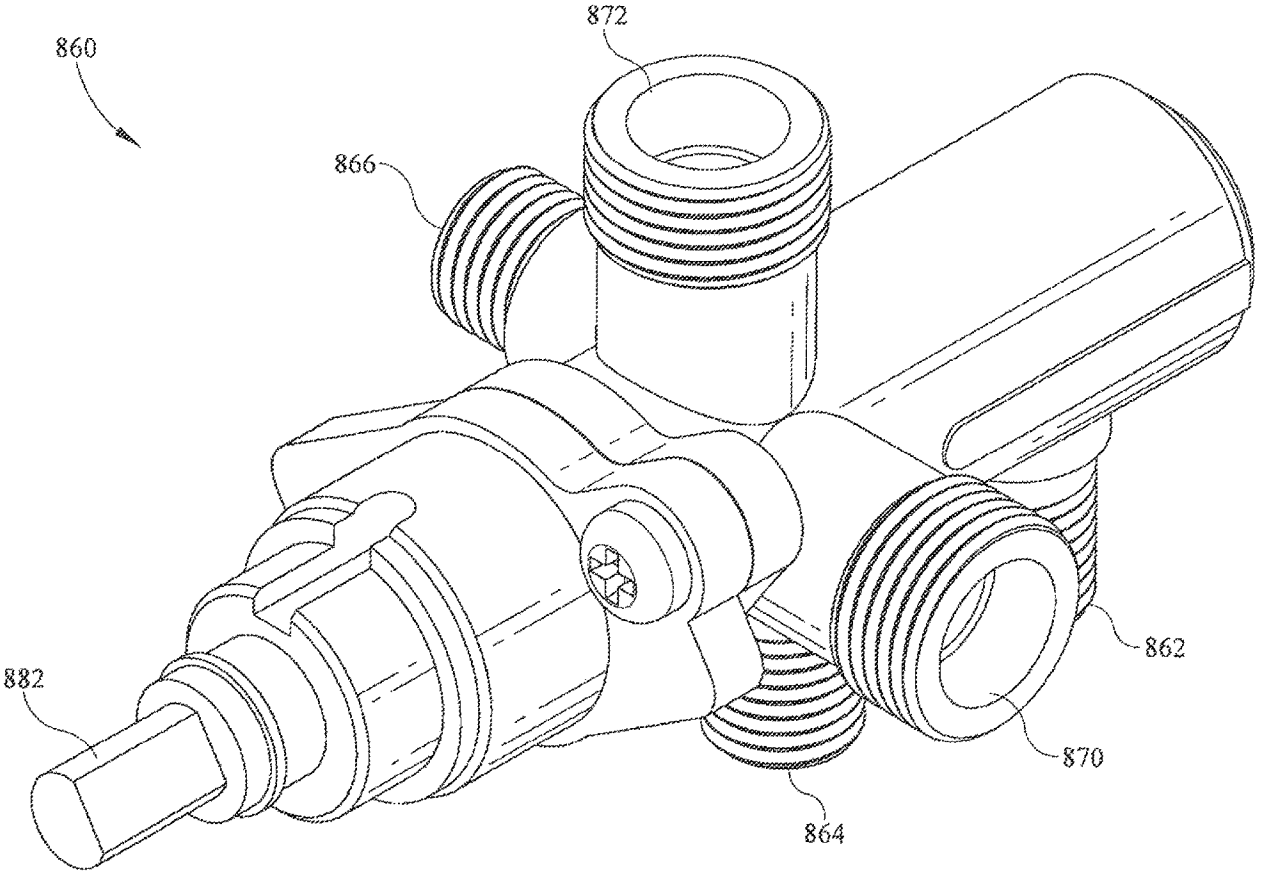
FIG. 13 is an isometric view of the multi-positional manual control valve of FIG. 12.

Turning to FIG. 13, an isometric view of a preferred embodiment of multi-positional manual control valve 860 is shown. Multi-positional manual control valve 860 has a pilot line aperture 862, a LP pilot supply line aperture 864, a NG pilot supply line aperture 866, a fuel injector line aperture 870, and a fuel injector supply line aperture 872. Multi-positional manual control valve 860 also has an extension 882 which extends exteriorly and allows for attachment of a knob (not shown) for selection between LP and NG through rotational adjustment of internal orifices. In a first position, pilot line aperture 862 is in flow communication with LP pilot supply line aperture 864 and fuel injector line aperture 870 is in flow communication with fuel injector supply line aperture 872 and at least a portion of the internal orifice is restricted that communicates input from injector line aperture 870 to fuel injector supply line aperture 872. In a second position, pilot line aperture 862 is in flow communication with NG pilot supply line aperture 866 and fuel injector line aperture 870 is in flow communication with fuel injector supply line aperture 872.

Figure 14:
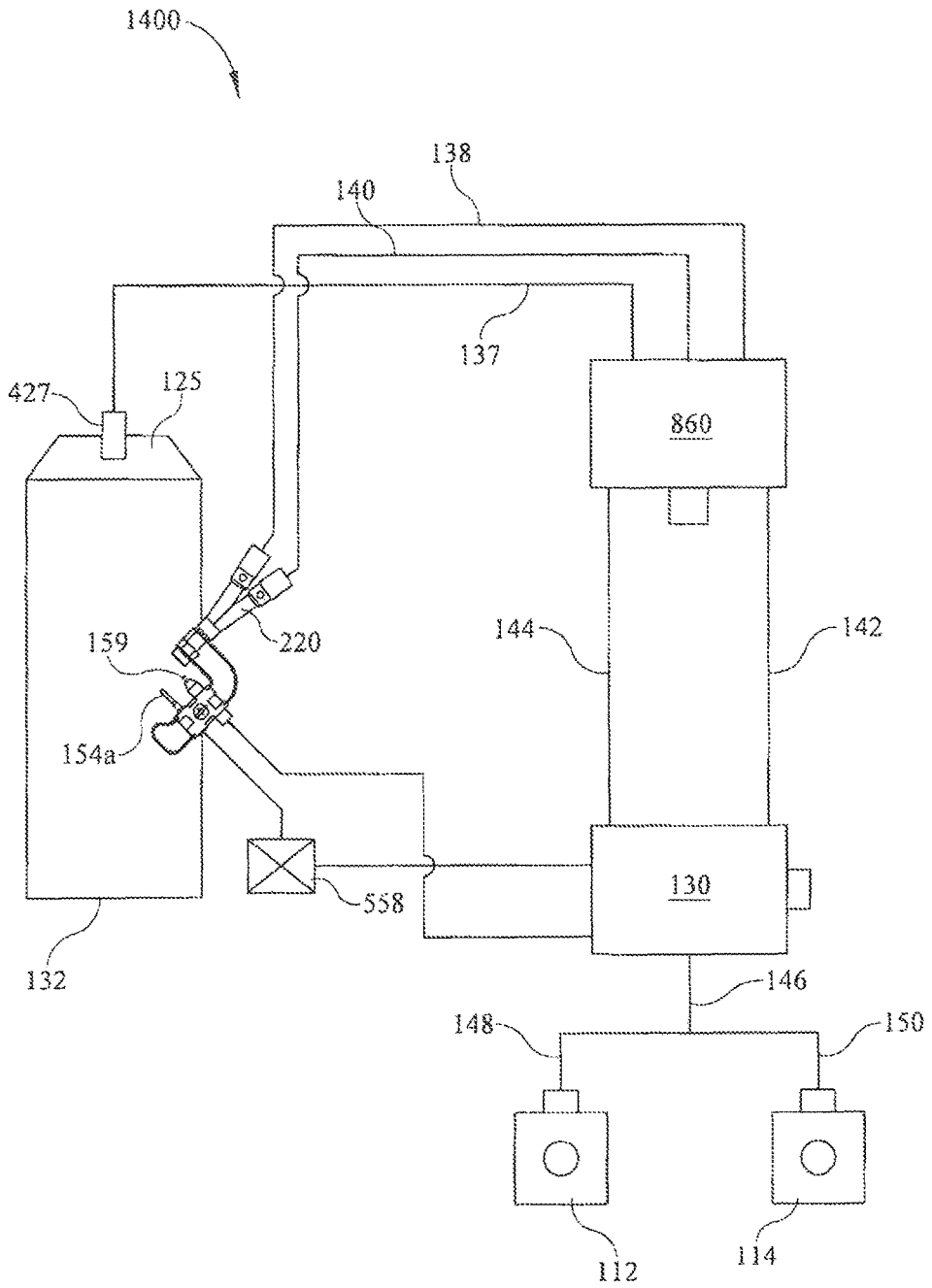
FIG. 14 is a schematic view of a dual fuel vent free heater having a multi-positional manual control valve, a thermal switch, a thermostatic control, a single fuel injector, and a pilot flame burner equipped for use with two fuels.

FIG. 14 shows a schematic view of dual fuel vent free heater 1400. Dual fuel vent free heater 1400 is similar to dual fuel vent free heater 1200, except that it is shown without linkage 880 or air shutter 133 and has a single piezometric igniter 159, a single temperature sensor 154a, and a pilot flame burner equipped for use with two fuels 220. Single temperature sensor 154a preferably interacts with thermostatic control 130 to provide for an oxygen detection system as previously described and additionally preferably interacts with thermal switch 558 to provide for a complete safety shutoff system as previously described.

Figure 15:
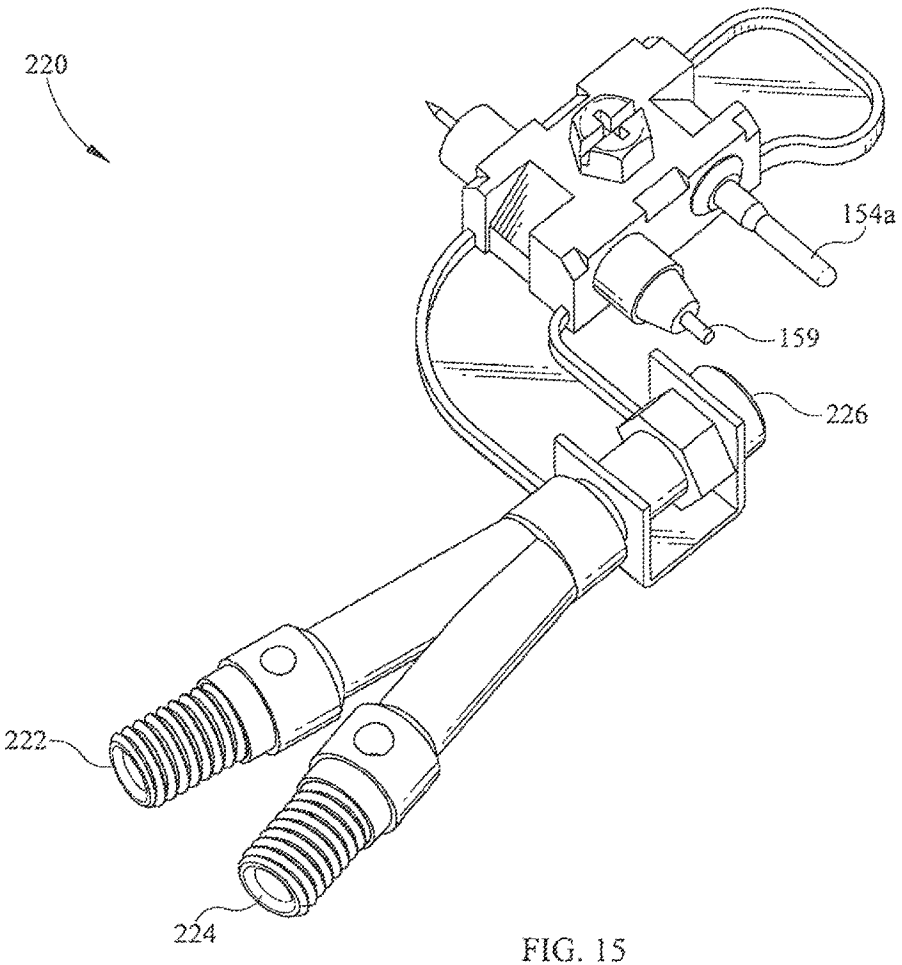
FIG. 15 is an isometric view of the pilot flame burner equipped for use with two fuels of FIG. 14.

Turning to FIG. 15, pilot flame burner equipped for use with two fuels 220 has a first fuel input orifice 222, a second fuel input orifice 224, and a single fuel nozzle 226. First fuel input orifice 222 and second fuel input orifice 224 are shown in FIG. 14 in communication with pilot supply lines 140 and 138 respectively. Since multi-positional manual control valve 860 merely redirects flow from pilot line 142 to pilot supply line 138 or pilot supply line 140, the initial orifice size of first fuel input orifice 222 and second fuel input orifice 224 are preferably substantially the same. However, at some point before the merger of first fuel input orifice 222 and second fuel input orifice 224, the orifice size of first fuel input orifice 222 is restricted more than the orifice size of second fuel input orifice 224.

In a preferred embodiment, where multi-positional manual control valve 860 is adjustable to direct flow from pilot line 142 to pilot supply line 138 if natural gas is being used and adjustable to direct flow from pilot line 142 to pilot supply line 140 if liquid propane is being used, first fuel input orifice 222 is preferably restricted to a diameter of approximately 0.30 mm at some point before the merger of first fuel input orifice 222 and second fuel input orifice 224, whereas the minimum orifice size of second fuel input orifice 224 is approximately 0.42 mm. Of course, when natural gas and liquid propane are the two fuels being used the actual orifice sizes may vary to some degree while still allowing for a pilot flame burner with a single fuel nozzle that can be used with two fuels. Moreover, when other fuels are being used the actual orifice sizes may vary to an even larger degree. Restricting the orifice size of first fuel input orifice 222 more than the orifice size of second fuel input orifice 224 prior to the merger of the two, causes fuel volume to be restricted and allows single fuel nozzle 226 to function with either of two fuels. Moreover, the design and placement of pilot flame burner equipped for use with two fuels 220 enables fuel volume to be properly restricted without substantially affecting fuel velocity. Therefore, a single oxygen detection system having an igniter and at least one temperature sensor proximate a single fuel nozzle can be implemented into a number of dual fuel vent free heaters using pilot flame burner equipped for use with two fuels 220.

U.S. Pat. No. 5,807,098 teaches several aspects of a gas heater and a gas heater oxygen detection system and is incorporated by reference into the present document in its entirety. Using teachings from U.S. Pat. No. 5,807,098 it is clear, among other things, how more than one temperature sensor may be used with a dual fuel heater having a pilot flame burner equipped for use with two fuels 220, or other dual fuel heaters taught herein, to provide for added functionality. Moreover, it is clear that input could be diverted to either pilot line 142 or pilot supply line 138 and resultantly first fuel input orifice 222 and second fuel input orifice 224 of pilot flame burner equipped for use with two fuels 220 through use of other valves besides multi-positional manual control valve 860.

What is claimed is:

1. A dual fuel heater comprising: a first oxygen depletion sensor adapted for a first fuel, a second oxygen depletion sensor adapted for a second fuel, a main burner adapted for both the first fuel and the second fuel, a control valve having a first inlet fluid communicable with a first outlet and a second outlet, the first inlet configured to receive the first fuel and the second fuel, the control valve adapted to control the flow of fuel to the first and second oxygen depletion sensors through the first outlet and to control the flow of fuel to the main burner through the second outlet, a selector valve comprising [a first] *an* inlet fluid communicable with [a first] *an* outlet [and a second inlet fluid communicable with a second outlet], the [first] inlet of the selector valve coupled with the first outlet of the control valve by a first conduit, [the second inlet of the selector valve coupled with the second outlet of the control valve by a second conduit,] the [first] outlet of the selector valve in fluid communication with the first oxygen depletion sensor, [the second outlet of the selector valve in fluid communication with the main burner,] the selector valve adapted to transition between a first selector position and a second selector position, in the first selector position the selector valve [adapted to permitting] *permits* the flow of the first fuel between the [second] inlet and [second] outlet of the selector valve [and also to permit the flow of the first fuel between the first inlet and first outlet of the selector valve], in the second selector position the selector valve [adapted to permitting the flow of the second fuel between the second inlet and second outlet of the selector valve and also prevent] *prevents* the flow of the [second] *first* fuel between the [first] inlet and [first] outlet of the selector valve, the flow of the first fuel and the second fuel being permitted to the second oxygen depletion sensor via the first conduit [from a location between the first outlet of the control valve and the first inlet of the selector valve] so that the flow of the first fuel and the second fuel to the second oxygen depletion sensor is permitted regardless of whether the selector valve is in the first selector position or in the second selector position.

2. A dual fuel heater according to claim 1, wherein the first fuel is natural gas and the second fuel is liquefied petroleum gas.

3. A dual fuel heater according to claim 1, wherein the first fuel is natural gas and the second fuel is butane.

[4. A dual fuel heater comprising:

a first oxygen depletion sensor adapted for a first fuel, a second oxygen depletion sensor adapted for a second fuel, a main burner adapted for both the first fuel and the second fuel, a control valve having a first inlet fluid communicable with a first outlet and a second outlet, the first inlet configured to receive the first fuel and the second fuel, the control valve adapted to control the flow of fuel to the first and second oxygen depletion sensors through the first outlet and to control the flow of fuel to the main burner through the second outlet, a selector valve comprising a first inlet fluid communicable with a first outlet and a second inlet fluid communicable with a second outlet and a third outlet, the first inlet of the selector valve coupled with the first outlet of the control valve by a first conduit, the second inlet of the selector valve coupled with the second outlet of the control valve by a second conduit, the first outlet of the selector valve in fluid communication with the first oxygen depletion sensor, the second and third outlets of the selector valve in fluid communication with the main burner, the selector valve adapted to transition between a first selector position and a second selector position, in the first selector position the selector valve is adapted to permit the flow of the first fuel between the second inlet and second outlet of the selector valve and also to permit the flow of the first fuel between the first inlet and first outlet of the selector valve, in the second selector position the selector valve adapted to permit the flow of the second fuel between the second inlet and third outlet of the selector valve and also prevent the flow of the second fuel between the first inlet and first outlet of the selector valve, the flow of the first fuel and the second fuel being permitted to the second oxygen depletion sensor via the first conduit from a location between the first outlet of the control valve and the first inlet of the selector valve so that the flow of the first fuel and the second fuel to the second oxygen depletion sensor is permitted regardless of whether the selector valve is in the first selector position or in the second selector position.]

[5. A dual fuel heater according to claim 4, wherein the first fuel is natural gas and the second fuel is liquefied petroleum gas.]

[6. A dual fuel heater according to claim 4, wherein the first fuel is natural gas and the second fuel is butane.]

*7. A dual fuel heater according to claim 1, wherein the flow of the first fuel and the second fuel is permitted to the second oxygen depletion sensor via the first conduit from a location between the first outlet of the control valve and the inlet of the selector valve.*

* * * * *